United States Patent
Ohta et al.

(10) Patent No.: US 7,561,668 B2
(45) Date of Patent: Jul. 14, 2009

(54) RADIATION DETECTING CASSETTE AND RADIATION IMAGE CAPTURING SYSTEM

(75) Inventors: Yasunori Ohta, Kanagawa (JP); Eiichi Kito, Kanagawa (JP); Tsuyoshi Tanabe, Kanagawa (JP); Takuya Yoshimi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/222,407

(22) Filed: Aug. 8, 2008

(65) Prior Publication Data

US 2009/0039276 A1 Feb. 12, 2009

(30) Foreign Application Priority Data

Aug. 9, 2007 (JP) ............................. 2007-207541
Jul. 1, 2008 (JP) ............................. 2008-172106

(51) Int. Cl.
*H05G 1/10* (2006.01)
(52) U.S. Cl. ..................... 378/102; 378/114; 378/165
(58) Field of Classification Search ............... 378/98.8, 378/101, 102, 103, 116, 117, 162, 165, 167, 378/181, 182; 250/370.08, 370.09, 370.11
See application file for complete search history.

(56) References Cited

U.S. PATENT DOCUMENTS

2005/0205813 A1* 9/2005 Ishikawa ..................... 250/584
2006/0034427 A1* 2/2006 Brooks ....................... 378/198

FOREIGN PATENT DOCUMENTS

| JP | 07-140255 | 6/1995 |
| JP | 2000-105297 | 4/2000 |
| JP | 2004-141473 | 5/2004 |
| JP | 2006055201 A * | 3/2006 |

* cited by examiner

*Primary Examiner*—Courtney Thomas
(74) *Attorney, Agent, or Firm*—Jean C. Edwards, Esq.; Akerman Senterfitt

(57) ABSTRACT

A radiation detecting cassette includes an IC card detector which detects insertion of an IC card in a slot, outputs a detection signal representing that the IC card is inserted in the slot, and reads ID information stored in the IC card. An ID checker of the radiation detecting cassette checks the ID information against ID information stored in a card ID memory. A battery controller controls a battery to start supplying electric power to a radiation detector based on a checking result from the ID checker.

14 Claims, 15 Drawing Sheets

RADIATION DETECTING CASSETTE AND RADIATION IMAGE CAPTURING SYSTEM

CROSS-REFERENCE TO RELATED APPLICATIONS

The present application claims priority from Japanese Patent Application Nos. 2007-207541, filed Aug. 9, 2007, and 2008-172106, filed Jul. 1, 2008, the contents of both of which are herein incorporated by reference in their entirety.

BACKGROUND OF THE INVENTION

1. Field of the Invention

The present invention relates to a radiation image cassette having a radiation conversion panel for detecting a radiation that has passed through a subject and converting the detected radiation into radiation image information, and a radiation image capturing system incorporating such a radiation image cassette.

2. Description of the Related Art

In the medical field, there have widely been used radiation image capturing apparatus which apply a radiation to a subject and guide the radiation that has passed through the subject to a radiation conversion panel, which captures a radiation image from the radiation. Known forms of the radiation conversion panel include a conventional radiation film for recording a radiation image by way of exposure, and a stimulable phosphor panel for storing radiation energy representing a radiation image in a phosphor and reproducing the radiation image as stimulated light by applying stimulating light to the phosphor. The radiation film with the recorded radiation image is supplied to a developing device to develop the radiation image, or the stimulable phosphor panel is supplied to a reading device in order to read the radiation image as a visible image.

In an operating room or the like, it is necessary to read a recorded radiation image immediately from the radiation conversion panel after the radiation image has been captured, for the purpose of quickly and appropriately treating the patient. As a radiation conversion panel that meets such a requirement, there has been developed a radiation detector having a solid-state detector for converting radiation directly into electric signals or for converting radiation into visible light with a scintillator and then converting the visible light into electric signals, so as to read the detected radiation image.

Japanese Laid-Open Patent Publication No. 2004-141473 discloses a radiation image cassette housing a radiation conversion panel therein and a radiation image capturing system incorporating such a radiation image cassette. According to the disclosed radiation image capturing system, an adapter (recording medium) removed from the radiation image cassette is inserted into an image capturing apparatus, and the image capturing apparatus detects cassette ID information for identifying the radiation image cassette from the recording medium, making it possible to capture a radiation image in the radiation image cassette by the radiation image apparatus.

Generally, a radiation image cassette is assigned to a subject (patient). According to the technology disclosed in Japanese Laid-Open Patent Publication No. 2004-141473, when a radiation image of a certain patient is to be captured, if the radiological technician or surgeon prepares a radiation image cassette for another patient by mistake, removes the recording medium from the wrong radiation image cassette, and inserts it into the image capturing apparatus, then the wrong cassette ID information is registered in the image capturing apparatus. As a result, the radiation image of the certain patient is captured based on the information of the other patient.

When the recording medium is removed from a radiation detecting cassette, electric power starts being supplied from a battery to the radiation conversion panel in the radiation detecting cassette to allow a radiation image to be captured in the radiation conversion panel. However, if the recording medium is lost before it is inserted into the image capturing apparatus, then no radiation image can be captured in the radiation conversion panel, and the electric power from the battery is wastefully consumed.

SUMMARY OF THE INVENTION

It is an object of the present invention to provide a radiation detecting cassette and a radiation image capturing system which are capable of reliably and efficiently capturing a radiation image by preventing the radiation detecting cassette from being mistaken at the time the radiation image is captured and by saving electric power stored by a battery in the radiation detecting cassette.

A radiation detecting cassette according to the present invention comprises a radiation conversion panel for detecting a radiation that has passed through a subject and converting the radiation into radiation image information, a recording medium mounting region for mounting therein a recording medium storing ID information of a person involved in capturing a radiation image, a recording medium detector for detecting mounting of the recording medium in the recording medium mounting region, a battery for energizing the radiation conversion panel, and a battery controller for controlling the battery to start supplying electric power to the radiation conversion panel based on a detected result from the recording medium detector.

According to the present invention, the recording medium detector detects mounting of the recording medium in the recording medium mounting region, and the battery controller controls the battery to start supplying electric power to the radiation conversion panel based on the detected result from the recording medium detector.

Since the radiation detecting cassette is placed in a stable capable of capturing the radiation image information when the recording medium storing the ID information of a person involved in capturing the radiation image is mounted in the recording medium mounting region, a wrong radiation detecting cassette is prevented from being mistaken as the proper radiation detecting cassette, and the battery can save electric power stored therein. Therefore, the radiation image can be captured reliably and efficiently.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
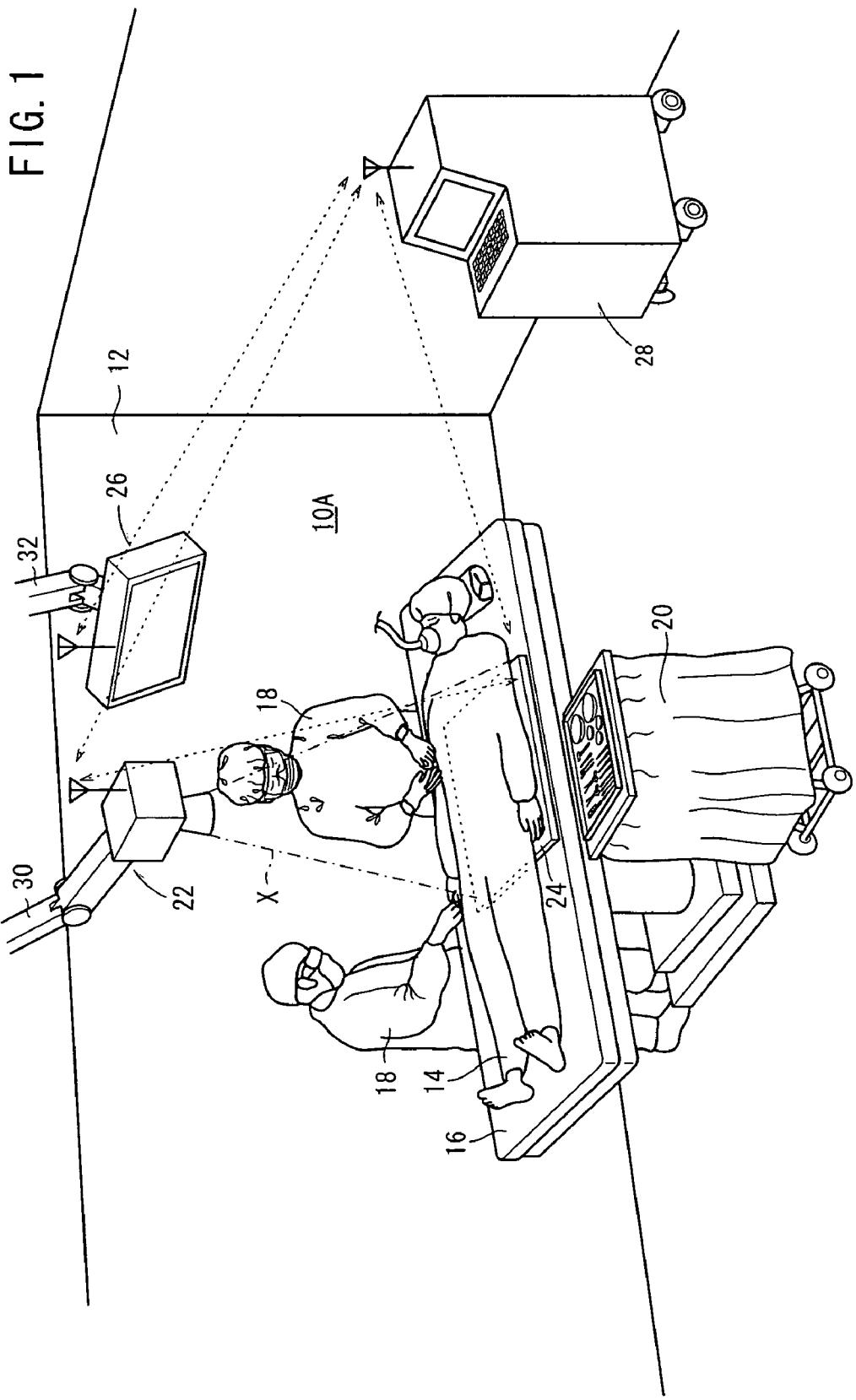
FIG. 1 is a perspective view of an operating room incorporating a radiation image capturing system according to a first embodiment of the present invention.

Like or corresponding parts are denoted by like or corresponding reference characters throughout views.

As shown in FIG. 1, an operating room 12 incorporates a radiation image capturing system 10A according to a first embodiment of the present invention. The operating room 12 has, in addition to the radiation image capturing system 10A, a surgical table (bed) 16 for a patient 14 to lie thereon, and an instrument table 20 disposed on one side of the surgical table 16 for placing thereon various tools and instruments to be used by surgeons 18 operating on the patient 14. The surgical table 16 is surrounded by various apparatus required for performing surgical operations, including an anesthesia apparatus, an aspirator, an electrocardiograph, a blood pressure monitor, etc.

The radiation image capturing system 10A includes an image capturing apparatus 22 for irradiating the patient 14 as a subject with radiation X at a dose according to image capturing conditions, a radiation detecting cassette 24 housing therein a radiation detector (radiation conversion panel) 40 (see FIGS. 2, 4, and 5) for detecting radiation X that has passed through the patient 14, a display device 26 for displaying a radiation image based on radiation X detected by the radiation detector 40, and a console (controller) 28 for controlling the image capturing apparatus 22, the radiation detecting cassette 24, and the display device 26. The image capturing apparatus 22, the radiation detecting cassette 24, the display device 26, and the console 28 send and receive signals by way of UWB (Ultra Wide Band) wireless communications.

The image capturing apparatus 22 is coupled to a universal arm 30 so as to be movable to a desired position for capturing images at a desired area of the patient 14 and also to be retractable to an out-of-the-way position while the surgeons 18 are performing a surgical operation on the patient 14. Similarly, the display device 26 is coupled to a universal arm 32 so as to be movable to a position where the surgeons 18 can easily confirm a captured radiation image displayed on the display device 26.

Figure 2:
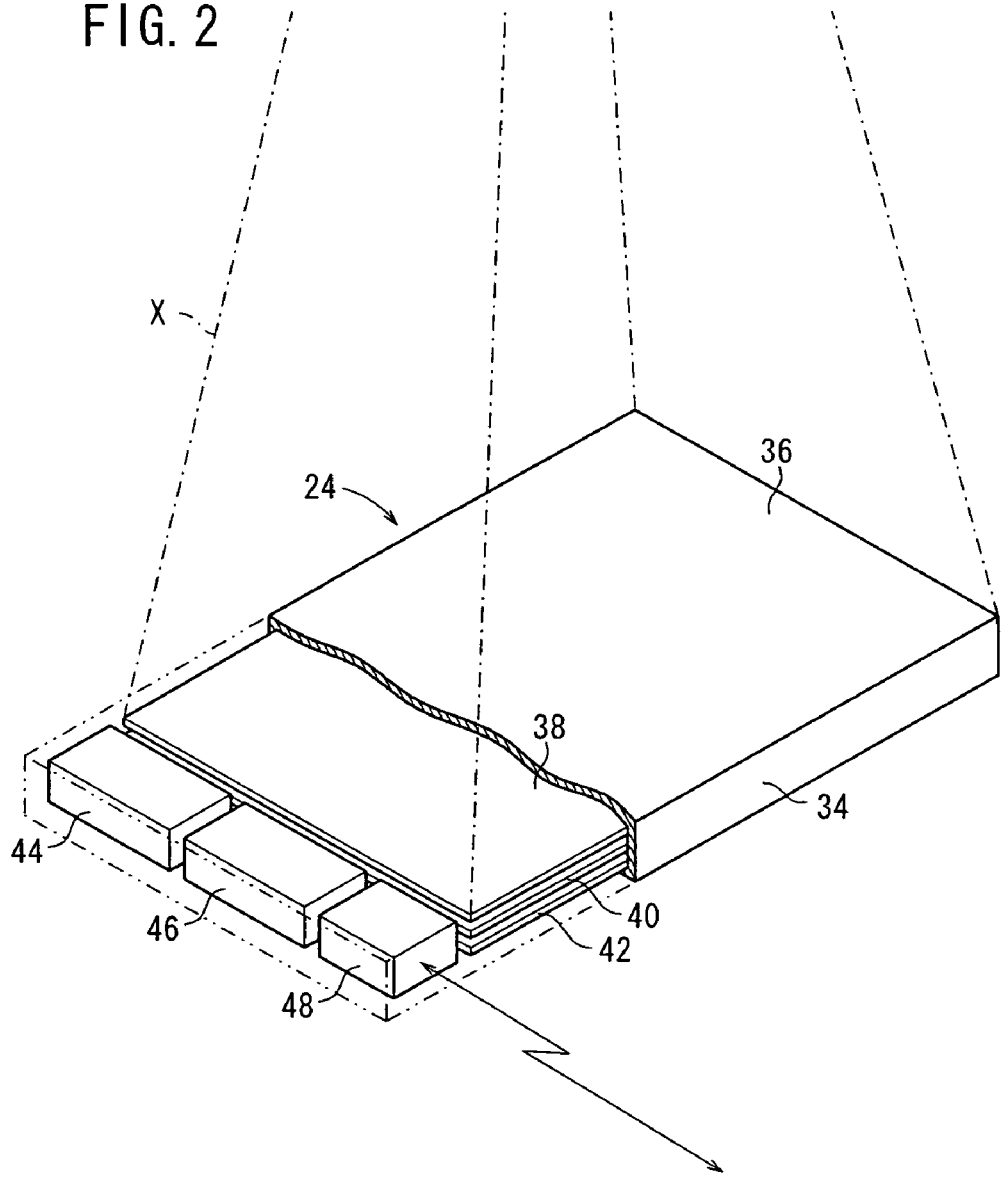
FIG. 2 is a perspective view, partly cut away, showing internal structural details of a radiation detecting cassette used in the radiation image capturing system shown in FIG. 1.

FIG. 2 shows in perspective the internal structural details of the radiation detecting cassette 24. As shown in FIG. 2, the radiation detecting cassette 24 has a casing 34 made of a material that is permeable to radiation X. The casing 34 houses therein a grid 38 for removing scattered rays from the radiation X from the patient 14, a radiation detector 40 for detecting radiation X that has passed through the patient 14, and a lead plate 42 for absorbing back scattered rays from the radiation X. The grid 38, the radiation detector 40, and the lead plate 42 are successively arranged in that order from an irradiated surface 36 of the casing 34, which is irradiated with radiation X. The irradiated surface 36 of the casing 34 may also be constructed so as to form the grid 38.

The casing 34 also houses therein a battery 44, which makes up a power supply for the radiation detecting cassette 24, a cassette controller 46 for energizing the radiation detector 40 with electric power supplied from the battery 44, and a transceiver (wireless communication unit) 48 for sending and receiving signals, including information of the radiation X that is detected by the radiation detector 40, to and from the console 28. A shield plate of lead or the like should preferably be placed over the side surfaces of the cassette controller 46 and the transceiver 48 under the irradiated surface 36 of the casing 34, so as to protect the cassette controller 46 and the transceiver 48 against damage which would otherwise be caused if the cassette controllers 46 and the transceiver 48 were irradiated with radiation X.

Figure 3:
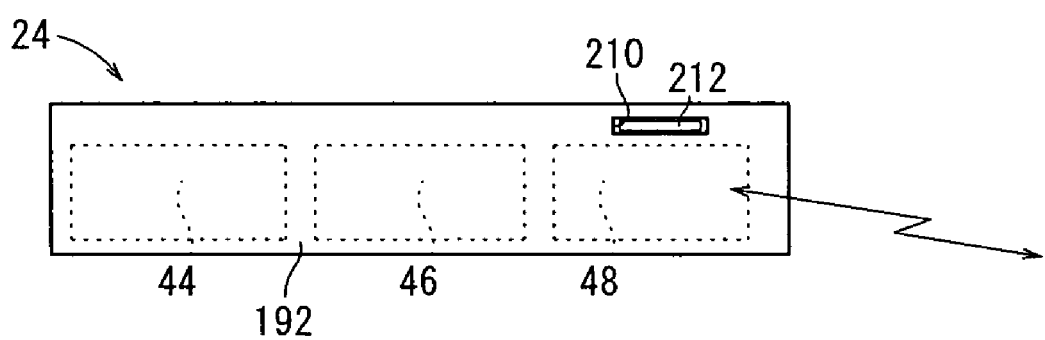
FIG. 3 is a front elevational view of the radiation detecting cassette shown in FIGS. 1 and 2.
Figure 4:
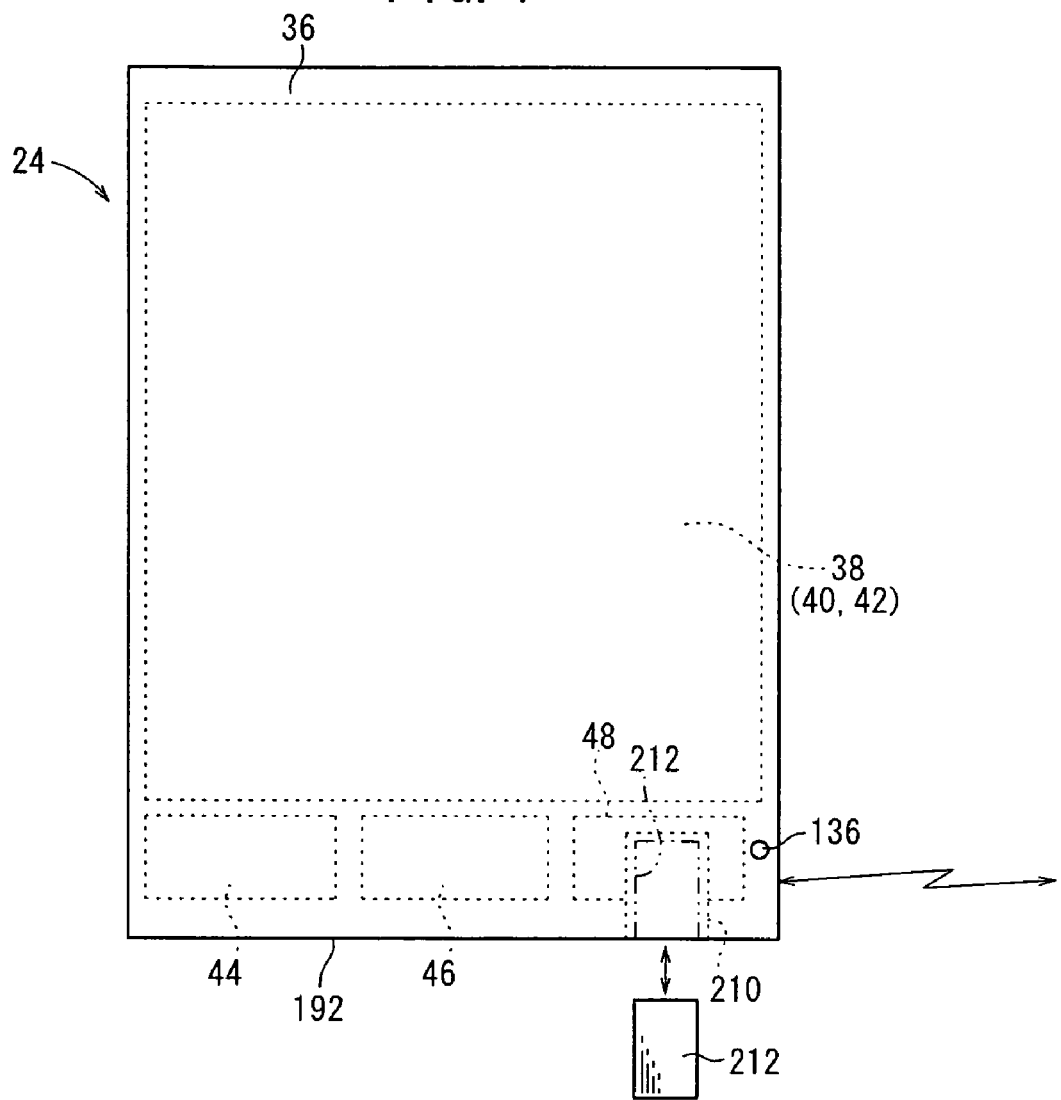
FIG. 4 is a plan view of the radiation detecting cassette shown in FIGS. 1 to 3.

FIG. 3 shows in front elevation the radiation detecting cassette 24 as seen from a side wall 192 thereof adjacent to the battery 44, the cassette controller 46, and the transceiver 48, and FIG. 4 shows in plan the radiation detecting cassette 24.

The side wall 192 has a slot (recording medium mounting region) 210 defined therein for receiving an IC card (recording medium) 212 inserted therein. The IC card 212 is a recording medium for recording identifying information (ID information) for identifying the patient 14 as a subject or a person involved in the capture of a radiation image, such as a surgeon 18 or a radiological technician. The IC card 212 may be a contact-type or a non-contact-type IC card. The IC card 212 may be in the form of an examination card carried by the patient 14 and storing a patient ID number as part of ordering information, to be described later, a diagnosis and treatment card storing the patient ID number and given to the patient 14 at a diagnosis and treatment department, or an ID card carried by the surgeon 18 or the radiological technician and storing the ID information of the surgeon 18 or the radiological technician. The recording medium may be any recording medium insofar as it can store ID information (ID number). Therefore, a magnetic card may be used instead of the IC card.

The casing 34 supports a display unit (first through third warning units) 136 on the corner of the irradiated surface 36 near the transceiver 48. The radiation detecting cassette 24 is usually a radiation detecting cassette that is assigned to the patient 14. If the IC card 212 mounted (inserted) in the slot 210 does not match the radiation detecting cassette 24, e.g., if the patient 14 represented by the ID information stored in the IC card 212 is different from the patient 14 to which the radiation detecting cassette 24 is assigned, then the display unit 136 indicates the discrepancy to the surgeons 18 or the radiological technician in the operating room 12 by way of light emission from a light-emitting diode (LED) or the like.

When the IC card 212 has been inserted in the slot 210 for a long period of time, the display unit 136 also indicates to the surgeons 18 or the radiological technician the fact that the IC card 212 is in the slot 210, by way of light emission from the LED.

Figure 5:
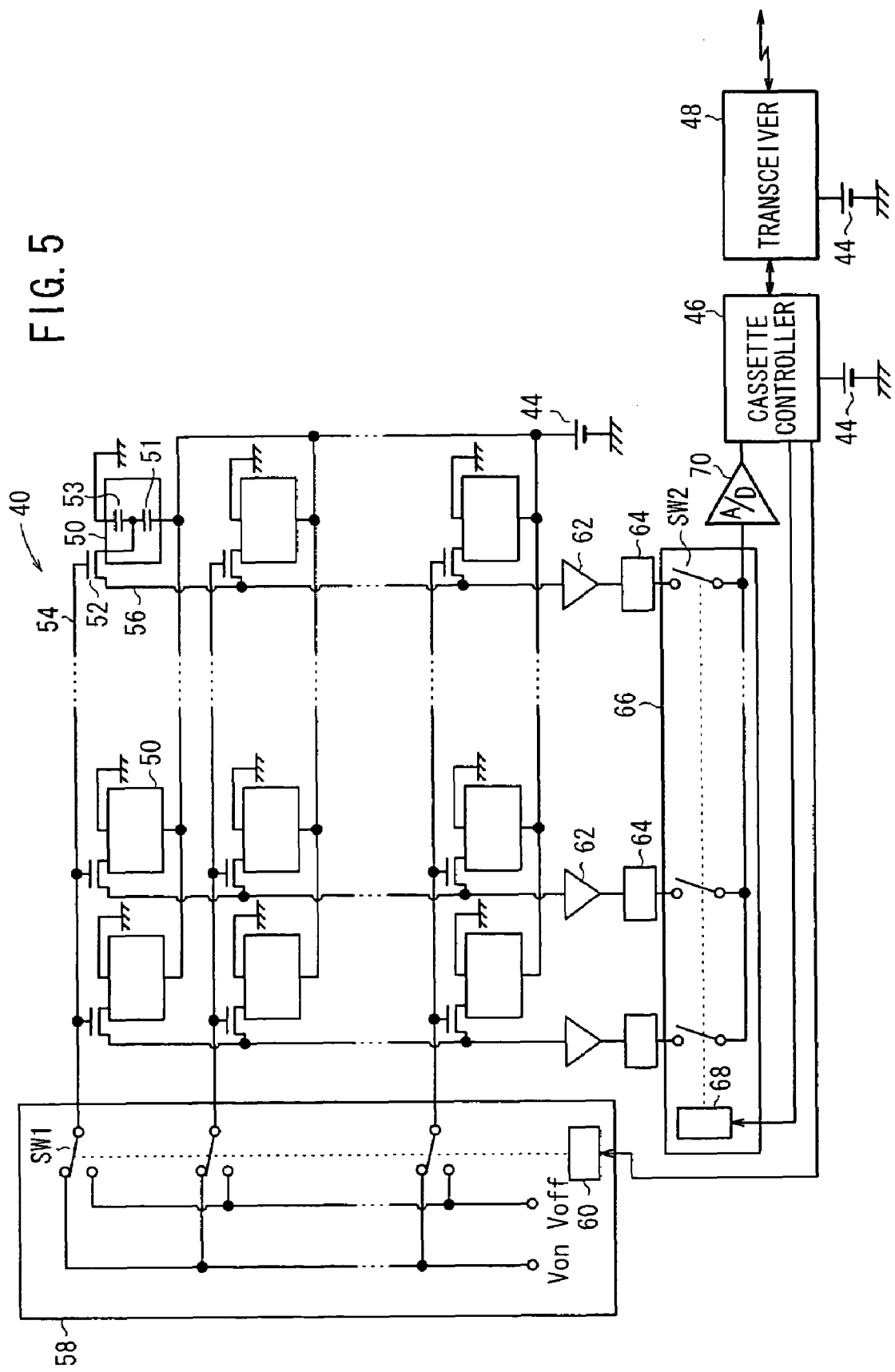
FIG. 5 is a block diagram of a circuit arrangement of a radiation detector in the radiation detecting cassette shown in FIG. 2.

FIG. 5 shows in block form a circuit arrangement of the radiation detector 40. As shown in FIG. 5, the radiation detector 40 comprises an array of thin-film transistors (TFTs) 52 arranged in rows and columns, a photoelectric conversion layer 51 made of a material such as amorphous selenium (a-Se) for generating electric charges upon detection of radiation X, the photoelectric conversion layer 51 being disposed over the array of TFTs 52, and an array of storage capacitors 53 connected to the photoelectric conversion layer 51. When the radiation X is applied to the radiation detector 40, the photoelectric conversion layer 51 generates electric charges, and the storage capacitors 53 store the generated electric charges. Then, the TFTs 52 are turned on along each row at a time to read the electric charges from the storage capacitors 53 as an image signal. In FIG. 5, the photoelectric conversion layer 51 and one of the storage capacitors 53 are shown as making up a pixel 50, wherein the pixel 50 is connected to one of the TFTs 52. Details of the other pixels 50 are omitted from illustration. Since amorphous selenium tends to change its structure and lose its function at high temperatures, it needs to be used within a certain temperature range. Therefore, some means for cooling the radiation detector 40 should preferably be provided in the radiation detecting cassette 24.

The TFTs 52 which are connected to the respective pixels 50, are also connected to respective gate lines 54 extending in parallel to the rows, and to respective signal lines 56 extending in parallel to the columns. The gate lines 54 are connected to a line scanning driver 58, and the signal lines 56 are connected to a multiplexer 66 serving as a reading circuit. The gate lines 54 are supplied with control signals Von, Voff from the line scanning driver 58 for turning on and off the TFTs 52 along the rows. The line scanning driver 58 comprises a plurality of switches SW1 for switching between the gate lines 54, and an address decoder 60 for outputting a selection signal for selecting one of the switches SW1 at a time. The address decoder 60 is supplied with an address signal from the cassette controller 46.

The signal lines 56 are supplied with electric charges stored in the storage capacitors 53 of the pixels 50 through the TFTs 52 arranged in the columns. The electric charges supplied to the signal lines 56 are amplified by amplifiers 62 connected respectively to the signal lines 56. The amplifiers 62 are connected through respective sample and hold circuits 64 to the multiplexer 66. The multiplexer 66 comprises a plurality of switches SW2 for successively switching between the signal lines 56 and an address decoder 68 for outputting a selection signal for selecting one of the switches SW2 at a time. The address decoder 68 is supplied with an address signal from the cassette controller 46. The multiplexer 66 has an output terminal connected to an A/D converter 70. A radiation image signal generated by the multiplexer 66 based on the electric charges from the sample and hold circuits 64 is converted by the A/D converter 70 into a digital image signal representing radiation image information, which is supplied to the cassette controller 46.

Figure 6:
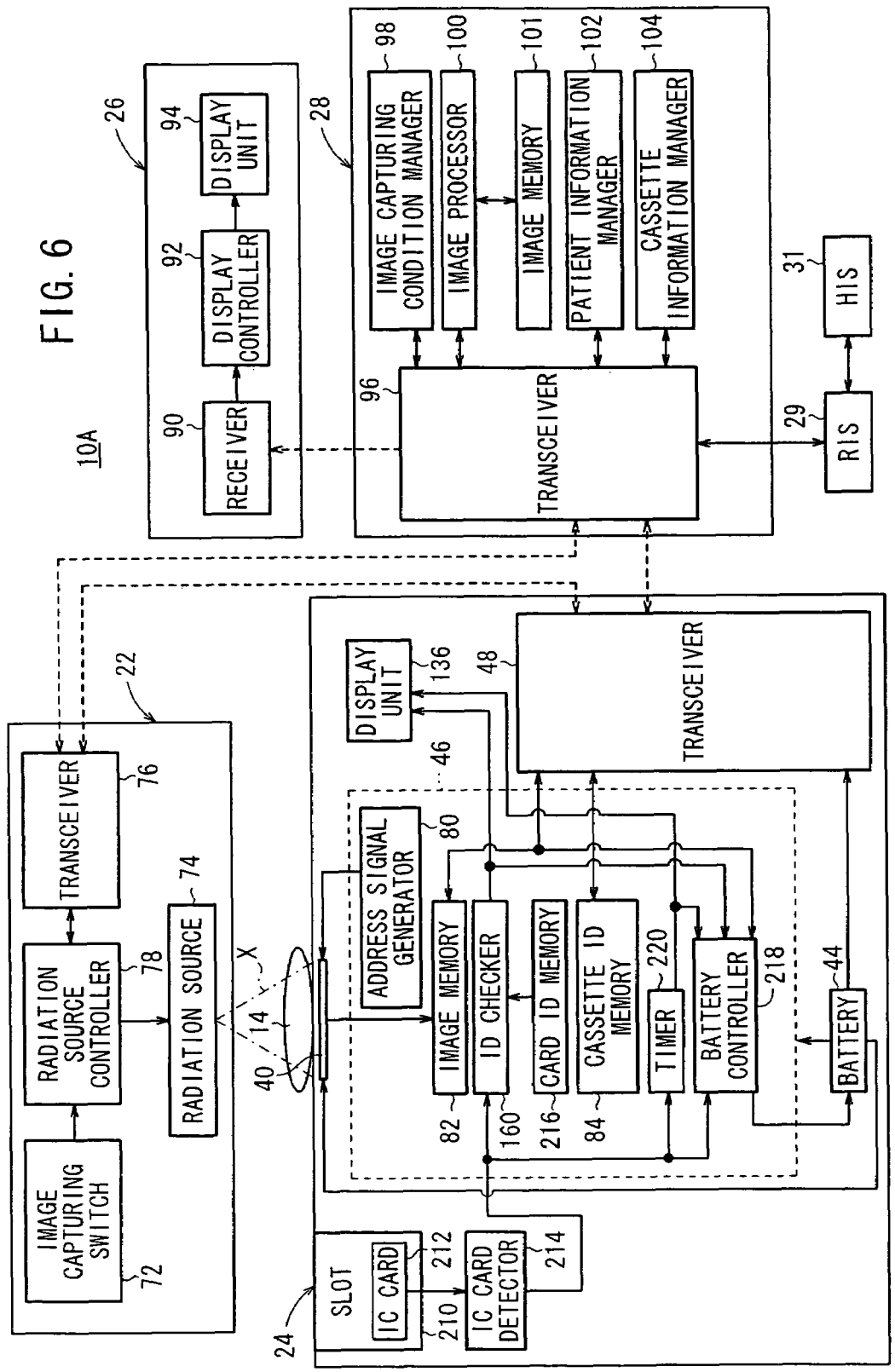
FIG. 6 is a block diagram of the radiation image capturing system shown in FIG. 1.

FIG. 6 shows in block form the radiation image capturing system 10A which comprises the image capturing apparatus 22, the radiation detecting cassette 24, the display device 26, and the console 28. The console 28 is connected to a radiology information system (RIS) 29, which generally manages radiation image information handled by the radiological department of the hospital along with other information. The RIS 29 is connected to a hospital information system (HIS) 31, which generally manages medical information in the hospital.

The image capturing apparatus 22 comprises an image capturing switch 72, a radiation source 74, a transceiver 76, and a radiation source controller 78.

The transceiver 76 receives image capturing conditions from the console 28 by way of wireless communications, and transmits an image capturing completion signal, etc. to the console 28 by way of wireless communications. The transceiver 76 is also capable of performing wireless communications with the transceiver 48 of the radiation detecting cassette 24.

The radiation source controller 78 controls the radiation source 74 based on an image capturing start signal supplied from the image capturing switch 72 and image capturing conditions supplied from the transceiver 76. The radiation source 74 outputs the radiation X under the control of the radiation source controller 78.

The radiation detecting cassette 24 further includes an IC card detector (recording medium detector) 214 in addition to the grid (see FIGS. 2 and 4), the radiation detector 40, the lead plate 42, the battery 44, the cassette controller 46, the transceiver 48, the display unit 136, and the slot 210. These, including IC card detector 214, are disposed in the casing 34.

The cassette controller 46 of the radiation detecting cassette 24 comprises an address signal generator 80, an image memory 82, a cassette ID memory 84, an ID checker 160, a card ID memory (ID storage) 216, a battery controller 218, and a timer 220.

The address signal generator 80 supplies address signals to the address decoder 60 of the line scanning driver 58 and to the address decoder 68 of the multiplexer 66 of the radiation detector 40. The image memory 82 stores the radiation image information detected by the radiation detector 40. The cassette ID memory 84 stores cassette ID information for identifying the radiation detecting cassette 24.

When the IC card 212 is inserted in the slot 210, the IC card detector 214 detects the IC card 212, reads the ID information stored in the IC card 212, outputs the read ID information to the ID checker 160, and outputs a detection signal indicative of the detection of the IC card 212 to the battery controller 218 and the timer 220. When the IC card 212 is removed from the slot 210, the IC card detector 214 detects the removal of the IC card 212, and stops outputting the detection signal to the battery controller 218 and the timer 220. The IC card detector 214 may detect the IC card 212 and read the ID information therefrom according to the known methods of detecting contact-type or non-contact-type IC cards and reading ID information therefrom. For example, if the IC card 212 is a contact-type IC card, then the IC card detector 214 outputs a detection signal representing whether the IC card 212 is inserted or not through an IC card socket, not shown, and reads the ID information stored in the IC card 212 through the IC card socket.

The ID checker 160 checks the ID information from the IC card detector 214 against the ID information stored in the card ID memory 216. If the ID information from the IC card detector 214 matches the ID information stored in the card ID memory 216, then the ID checker 160 outputs a control signal for supplying electric power to the radiation detector 40 to the battery controller 218. If the ID information from the IC card detector 214 does not match the ID information stored in the card ID memory 216, then the ID checker 160 does not output a control signal for supplying electric power to the radiation detector 40, to the battery controller 218, but outputs a warning signal representing that the ID information from the IC card detector 214 does not match the ID information stored in the card ID memory 216, to the display unit 136. Based on the warning signal, the display unit 136 emits light from the LED, indicating the fact that the ID information in the IC card 212 does not match the ID information stored in the card ID memory 216, to the surgeons 18 or the radiological technician in the operating room 12.

The timer 220 starts measuring time from the time when it receives the detection signal from the IC card detector 214, i.e., the time when the IC card detector 214 detects the insertion of the IC card 212 into the slot 210. When the timer 220 has measured a predetermined period of time from the time, the timer 220 outputs a stop signal to stop supplying electric power to the radiation detector 40, to the battery controller 218 and the display unit 136. The predetermined period of time is set to a value longer than the period of time from the above time to the time when the transmission of radiation image information from the image memory 82 to the console 28 is finished, as described later. Based on the stop signal, the display unit 136 emits light from the LED to indicate, to the surgeons 18 or the radiological technician in the operating room 12, that the IC card 212 is in the slot 210 even after the transmission of radiation image information is finished, i.e., even after the radiation image is captured.

Based on the control signal from the ID checker 160, the battery controller 218 controls the battery 44 to start supplying electric power to the radiation detector 40, and also transmits an image capture permission signal indicating that the radiation detecting cassette 24 has been readied to capture a radiation image by the electric power supplied to the radiation detector 40 and is now capable of capturing a radiation image, via the transceiver 48 to the console 28 by way of wireless communications.

In the absence of the control signal input from the ID checker 160 or in response to the stop signal from the timer 220, the battery controller 218 controls the battery 44 to stop supplying electric power to the radiation detector 40 or the various components, i.e., the radiation detector 40, the cassette controller 46, and the transceiver 48, of the radiation detecting cassette 24.

The battery controller 218 also monitors whether radiation image information is output from the image memory 82 to the transceiver 48 or not, i.e., whether or not radiation image information is output from the image memory 82 to the console 28 via the transceiver 48 by way of wireless communications. When the detection signal from the IC card detector 214 stops being supplied while the radiation image information is being transmitted, i.e., when the IC card detector 214 detects the removal of the IC card 212 from the slot 210 while the radiation image information is being transmitted, the battery controller 218 controls the battery 44 to stop supplying electric power to the various components of the radiation detecting cassette 24 which includes the radiation detector 40 after the transmission of the radiation image information is finished. After the transmission of the radiation image information is finished or when the detection signal from the IC card detector 214 stops being supplied to the battery controller 218 after the transmission of the radiation image information is finished, the battery controller 218 may control the battery 44 to stop supplying electric power to the various components of the radiation detecting cassette 24 which includes the radiation detector 40.

The battery 44 supplies electric power to the cassette controller 46 and the transceiver 48 at all times, and is controlled by the battery controller 218 to supply electric power to the radiation detector 40 or to the various components of the radiation detecting cassette 24 which includes the radiation detector 40.

It is assumed hereinafter that the battery controller 218 controls the battery 44 to stop supplying electric power to the radiation detector 40.

The transceiver 48 receives a transmission request signal from the console 28 by way of wireless communications and transmits the cassette ID information stored in the cassette ID memory 84, the radiation image information stored in the image memory 82, and an image capture permission signal to the console 28 by way of wireless communications.

The display device 26 comprises a receiver 90 for receiving radiation image information from the console 28, a display controller 92 for controlling the display of the received radiation image information, and a display unit 94 for displaying radiation image information processed by the display controller 92.

The console 28 comprises a transceiver 96, an image capturing condition manager 98, an image processor (image processing unit) 100, an image memory 101, a patient information manager 102, and a cassette information manager 104.

The transceiver 96 transmits and receives, by way of wireless communications, necessary information including radiation image information to and from the image capturing apparatus 22, the radiation detecting cassette 24, and the display device 26. The image capturing condition manager 98 manages image capturing conditions required for the image capturing apparatus 22 to capture radiation images. The image processor 100 processes radiation image information transmitted from the radiation detecting cassette 24. The image memory 101 stores the radiation image information processed by the image processor 100. The patient information manager 102 manages patient information of the patient 14 whose images are to be captured. The cassette information manager 104 manages cassette ID information transmitted from the radiation detecting cassette 24.

The console 28 may be located outside of the operating room 12, assuming that the console 28 can transmit and receive signals to and from the image capturing apparatus 22, the radiation detecting cassette 24, and the display device 26 by way of wireless communications.

The image capturing conditions refer to condition for determining a tube voltage, a tube current, an irradiation time, etc., which are required to apply radiation X at an appropriate dose to an area to be imaged of the patient 14. The image capturing conditions may include an area to be imaged of the patient 14, an image capturing method, etc., for example. The patient information refers to information used for identifying the patient 14, such as the patient's name, gender, patient ID number, etc., the ID information of the surgeons 18 and the radiological technician in charge of the surgical operation on the patient 14. Ordering information for instructing the radiation image capturing system 10A to capture a radiation image, including the image capturing conditions and the patient information, can be set directly via the console 28, or can be supplied from an external source to the console 28 via the RIS 29.

The radiation image capturing system 10A according to the first embodiment is basically constructed as described above, and operations of the radiation image capturing system 10A will be described below.

The radiation image capturing system 10A is installed in the operating room 12 and used when a radiation image of the patient 14 is required by surgeons 18 who are performing a surgical operation on the patient 14. Before a radiation image of the patient 14 is captured, patient information of the patient 14 to be imaged is registered in the patient information manager 102 of the console 28. If an area to be imaged of the patient 14 and an image capturing method are already known, such conditions are registered as image capturing conditions in the image capturing condition manager 98. The patient ID information of the patient 14, the ID information of the surgeons 18 who are in charge of the surgical operation on the patient 14 in the operating room 12, and the ID information of the radiological technician in the operating room 12 are registered in advance in the card ID memory 216 of the radiation detecting cassette 24 that is assigned to the patient 14. After the above preparatory process is finished, the surgeons 18 perform a surgical operation on the patient 14.

For capturing a radiation image of the patient 14 during the surgical operation, one of the surgeons 18 or the radiological technician places the radiation detecting cassette 24 between the patient 14 and the surgical table 16, with the irradiated surface 36 facing the image capturing apparatus 22. Then, one of the surgeons 18 or the radiological technician moves the image capturing apparatus 22 to a position facing the radiation detecting cassette 24, and then turns on the image capturing switch 72 to capture a radiation image of the patient 14.

Figure 7:
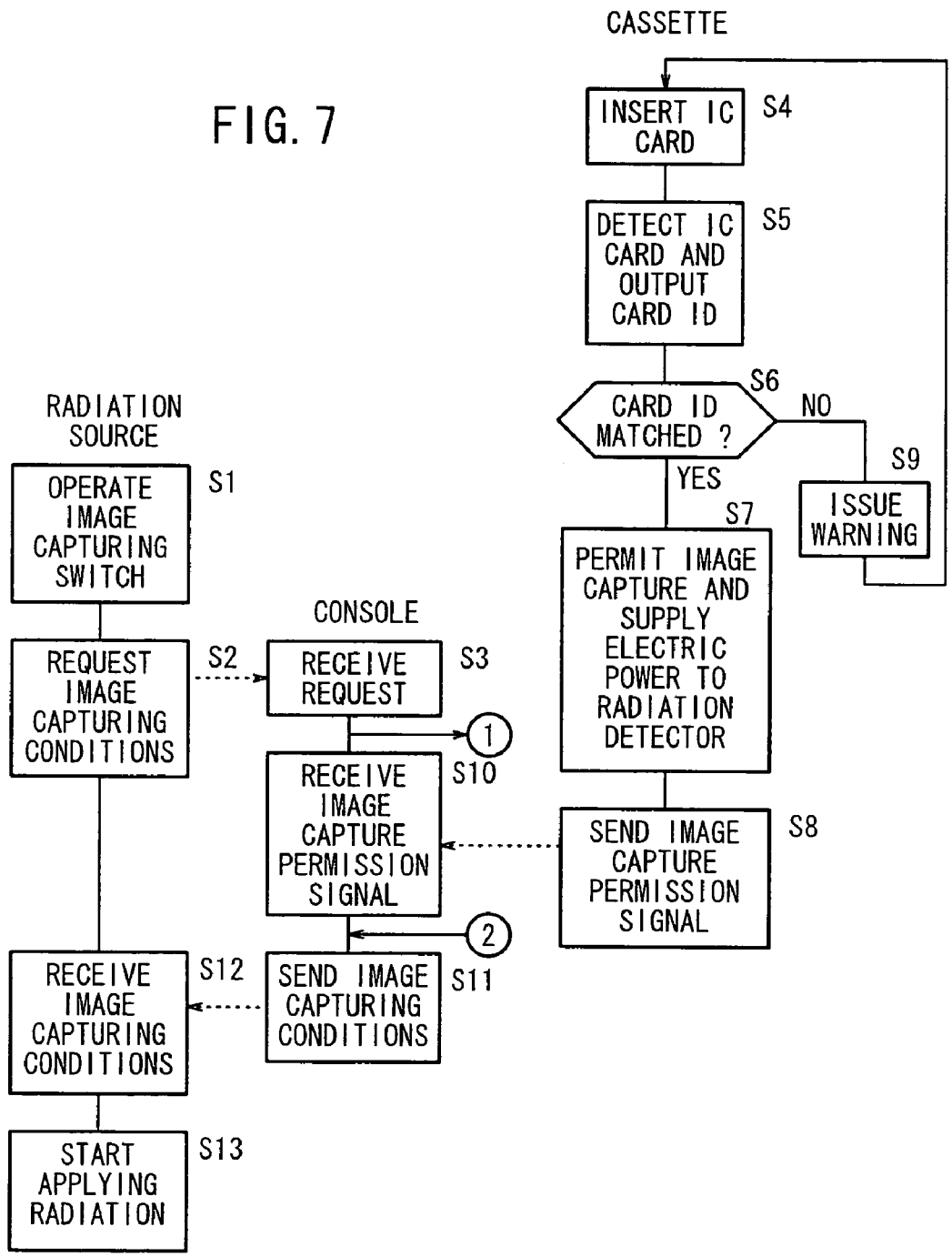
FIG. 7 is a flowchart of an operation sequence of the radiation image capturing system from the operation of an image capturing switch to the application of a radiation.

FIG. 7 is a flowchart of an operation sequence of the radiation image capturing system 10A from the operation of the image capturing switch 72 (step S1) to the application of the radiation X to the patient 14 (step S13).

After the preparatory process is performed, one of the surgeons 18 or the radiological technician turns on the image capturing switch 72 (see FIG. 6) in step S1. Then, the radiation source controller 78 of the image capturing apparatus 22 sends a request to the console 28 for sending the image capturing conditions via the transceivers 76, 96 in step S2. The console 28 receives the request in step S3.

In step S4, one of the surgeons 18 or the radiological technician inserts the IC card 212 (see FIGS. 3, 4, and 6) of the surgeon 18, the radiological technician or the patient 14, into the slot 210. The IC card detector 214 detects the IC card 212 inserted in the slot 210, outputs a detection signal to the battery controller 218 and the timer 220, reads the ID information from the IC card 212 in the slot 210, and outputs the read ID information to the ID checker 160 in step S5.

The one of the surgeons 18 or the radiological technician may insert the IC card 212 into the slot 210 in step S4 after or before the image capturing switch 72 is operated in step S1.

In step S6, the ID checker 160 checks the ID information from the IC card detector 214 against the ID information in the card ID memory 216. If the ID information from the IC card detector 214 matches the ID information in the card ID memory 216, then the ID checker 160 outputs a control signal to the battery controller 218. Based on the control signal, the battery controller 218 controls the battery 44 to start supplying electric power to the radiation detector 40, and outputs an image capture permission signal to the transceiver 48 in step S7. The battery 44 then starts supplying electric power to the radiation detector 40, and the transceiver 48 sends the image capture permission signal to the console 28 by way of wireless communications in step S8.

If it is judged that the ID information from the IC card detector 214 does not match the ID information in the card ID memory 216 in step S6, then the ID checker 160 does not output a control signal to the battery controller 218, but outputs a warning signal to the display unit 136. Based on the warning signal, the display unit 136 emits light from the LED to indicate, to the surgeons 18 or the radiological technician, that the patient 14, the surgeon 18, or the radiological technician which is represented by the ID number in the IC card 212 and the patient 14, the surgeon 18, or the radiological technician which is represented by the ID information in the card ID memory 216 do not match each other in step S9. Upon seeing the indication on the display unit 136, the surgeons 18 or the radiological technician recognizes that the IC card 212 and the radiation detecting cassette 24 do not match each other. Then, one of the surgeons 18 or the radiological technician replaces the IC card 212 presently inserted in the slot 210 with another IC card 212 in step S4, or replaces the radiation detecting cassette 24 with another radiation detecting cassette 24.

The console 28 receives the image capture permission signal in step S10, and then sends the image capturing conditions for an area to be imaged of the patient 14 which are registered in the image capturing condition manager 98, to the image capturing apparatus 22 via the transceivers 96, 76 in step S11. The radiation source controller 78 receives the image capturing conditions in step S12, and controls the radiation source 74 to apply a radiation X at a given dose to the patient 14 according to the image capturing conditions in step S13.

After step S13, radiation X that has passed through the patient 14 is applied to the grid 38, which removes scattered rays of the radiation X. Then, the radiation X is applied to the radiation detector 40, and converted into electric signals by the photoelectric conversion layer 51 of each of the pixels 50 of the radiation detector 40. The electric signals are stored as electric charges in the storage capacitors 53 (see FIG. 5). The stored electric charges, which represent radiation image information of the patient 14, are read from the storage capacitors 53 according to address signals which are supplied from the address signal generator 80 of the cassette controller 46 to the line scanning driver 58 and the multiplexer 66.

Specifically, in response to the address signal supplied from the address signal generator 80, the address decoder 60 of the line scanning driver 58 outputs a selection signal so as to select one of the switches SW1, which supplies the control signal Von to the gates of the TFTs 52 connected to the gate line 54 corresponding to the selected switch SW1. In response to the address signal supplied from the address signal generator 80, the address decoder 68 of the multiplexer 66 outputs a selection signal, which operates to successively turn on the switches SW2 so as to switch between the signal lines 56, for thereby reading the electric charges stored in the storage capacitors 53 of the pixels 50 connected to the selected gate line 54, through the signal lines 56.

The electric charges read from the storage capacitors 53 of the pixels 50, which are connected to the selected gate line 54, are amplified by respective amplifiers 62, sampled by the sample and hold circuits 64, and supplied to the multiplexer 66. Based on the supplied electric charges, the multiplexer 66 generates and supplies a radiation image signal to the A/D converter 70, which converts the radiation image signal into a digital signal. The digital signal, which represents the radiation image information, is stored in the image memory 82 of the cassette controller 46.

Similarly, the address decoder 60 of the line scanning driver 58 successively turns on the switches SW1 to switch between the gate lines 54 according to the address signal supplied from the address signal generator 80. The electric charges stored in the storage capacitors 53 of the pixels 50 connected to the successively selected gate lines 54 are read through the signal lines 56, and processed by the multiplexer 66 and the A/D converter 70 into digital signals, which are stored in the image memory 82 of the cassette controller 46.

The radiation image information represented by the digital signals stored in the image memory 82 is transmitted through the transceiver 48 to the console 28 by way of wireless communications.

The radiation image information transmitted to the console 28 is received by the transceiver 96, subjected to a predetermined image processing in the image processor 100, and then stored in the image memory 101 in association with the patient information of the patient 14 registered in the patient information manager 102.

The radiation image information processed by the image processor 100 is transmitted from the transceiver 96 to the display device 26. In the display device 26, the receiver 90 receives the radiation image information, and the display controller 92 controls the display unit 94 so as to display a radiation image based on the radiation image information. The surgeons 18 perform an operation on the patient 14 while visually confirming the radiation image displayed on the display unit 94.

In order to avoid a wasteful consumption of electric power in the radiation detecting cassette 24 during the operation sequence shown in FIG. 7, the battery controller 218 can perform the following processing operation:

Between the processing of step S6 and the end of the transmission of the radiation image information from the image memory 82 to the console 28, if one of the surgeons 18 or the radiological technician removes the IC card 212 from the slot 210 and the IC card detector 214 stops outputting the detection signal to the battery controller 218 and the timer 220, then the battery controller 218 controls the battery 44 to stop supplying electric power to the radiation detector 40 after the transmission of the radiation image information from the image memory 82 to the console 28 is finished.

The battery controller 218 may control the battery 44 to stop supplying electric power to the radiation detector 40 after the transmission of the radiation image information from the image memory 82 to the console 28 is finished.

Furthermore, after the transmission of the radiation image information from the image memory 82 to the console 28 is finished, if one of the surgeons 18 or the radiological technician removes the IC card 212 from the slot 210 and the IC card detector 214 stops outputting the detection signal to the battery controller 218 and the timer 220, then the battery controller 218 may control the battery 44 to stop supplying electric power to the radiation detector 40 after the IC card detector 214 stops outputting the detection signal.

Moreover, if the timer 220 supplies the stop signal to the battery controller 218 upon elapse of the predetermined period of time from the time when the IC card 212 is inserted into the slot 210, then the battery controller 218 may control the battery 44 to stop supplying electric power to the radiation detector 40 after the stop signal is supplied to the battery controller 218. In this case, the stop signal is also supplied to the display unit 136, which emits light from the LED based on the stop signal to indicate, to the surgeons 18 or the radiological technician in the operating room 12, that the IC card 212 is still in the slot 210 after the radiation image is captured.

In the radiation image capturing system 10A according to the first embodiment, the IC card detector 214 detects the insertion of the IC card 212 into the slot 210 of the radiation detecting cassette 24, and the battery controller 218 controls the battery 44 to start supplying electric power to the radiation detector 40 based on the detected insertion. Therefore, when the IC card 212 storing the ID information of the patient 14 or a person involved in the capture of a radiation image, such as one of the surgeons 18 or the radiological technician, is inserted into the slot 210, the radiation detecting cassette 24 is enabled to capture a radiation image. Accordingly, a wrong radiation detecting cassette 24 is prevented from being mistaken as the proper radiation detecting cassette 24, and the battery 44 is controlled to save electric power, so that the radiation image can be captured reliably and efficiently.

When the IC card detector 214 detects the insertion of the IC card 212 into the slot 210, the IC card detector 214 reads ID information stored in the IC card 212 and outputs the read ID information to the ID checker 160. The ID checker 160 checks the ID information from the IC card detector 214 against the ID information stored in the card ID memory 216. If the ID information from the IC card detector 214 matches the ID information stored in the card ID memory 216, then the ID checker 160 outputs a control signal to the battery controller 218. Based on the control signal, the battery controller 218 controls the battery 44 to start supplying electric power to the radiation detector 40. As the person represented by the ID information stored in the IC card 212 and the person represented by the ID information stored in the card ID memory 216 can be checked against each other, a wrong radiation detecting cassette 24 is reliably prevented from being mistaken as the proper radiation detecting cassette 24.

If the ID information from the IC card detector 214 does not match the ID information stored in the card ID memory 216, then the ID checker 160 outputs a warning signal to the display unit 136. Based on the warning signal, the display unit 136 emits light from the LED, indicating the fact that the ID information from the IC card detector 214 does not match the ID information stored in the card ID memory 216, to the surgeons 18 or the radiological technician. Therefore, the surgeons 18 or the radiological technician can reliably recognize that the radiation detecting cassette 24 is wrong, and can quickly take a corrective action by replacing the wrong radiation detecting cassette 24 with the proper radiation detecting cassette 24.

Since the supply of electric power from the battery 44 to the radiation detector 40 is controlled using the ID information which is part of the ordering information, the radiation image capturing system 10A can capture a radiation image depending on the ordering information.

When the detection signal from the IC card detector 214 stops being supplied to the battery controller 218 while the radiation image information is being transmitted from the transceiver 48 to the console 28 by way of wireless communications, the battery controller 218 controls the battery 44 to stop supplying electric power to the radiation detector 40 after the transmission of the radiation image information is finished. Consequently, the radiation detecting cassette 24 is prevented from wastefully consuming electric power after the transmission of the radiation image information is finished. As the battery 44 stops supplying electric power to the radiation detector 40 after the transmission of the radiation image information is finished, the radiation image information is reliably transmitted from the radiation detecting cassette 24 to the console 28.

When the IC card detector 214 stops supplying the detection signal to the battery controller 218 after the transmission of the radiation image information is finished, or after the transmission of the radiation image information is finished, the battery controller 218 may control the battery 44 to stop supplying electric power to the radiation detector 40 for thereby preventing the radiation detecting cassette 24 from wastefully consuming electric power after the transmission of the radiation image information is finished, and also for thereby reliably transmitting the radiation image information from the radiation detecting cassette 24 to the console 28.

The timer 220 starts measuring time from the time when the IC card 212 is inserted into the slot 210. When the timer 220 has measured a predetermined period of time, the timer 220 outputs a stop signal to the display unit 136. Based on the stop signal, the display unit 136 emits light from the LED to indicate, to the surgeons 18 or the radiological technician in the operating room 12, that the IC card 212 is in the slot 210. Consequently, if the IC card 212 is still in the slot 210 after the radiation image is captured, i.e., after the transmission of the radiation image information from the radiation detecting cassette 24 to the console 28 is finished, the surgeons 18 or the radiological technician is reliably notified of the fact that the IC card 212 is still in the slot 210.

The battery controller 218 may control the battery 44 to stop supplying electric power to the radiation detector 40 based on the stop signal from the timer 220, for thereby preventing the radiation detecting cassette 24 from wastefully consuming electric power after the transmission of the radiation image information is finished, and also for thereby reliably transmitting the radiation image information from the radiation detecting cassette 24 to the console 28.

In the above description, the battery controller 218 mainly controls the battery 44 to stop supplying electric power to the radiation detector 40 when the IC card detector 214 stops supplying the detection signal to the battery controller 218. However, the battery controller 218 may control the battery 44 to stop supplying electric power to the radiation detector 40, the cassette controller 46, and the transceiver 48, so that the battery 44 will serves as a more effective power saver.

Furthermore, signals are transmitted and received by way of the UWB wireless communications between the radiation detecting cassette 24 and the console 28, between the radiation detecting cassette 24 and the image capturing apparatus 22, between the image capturing apparatus 22 and the console 28, and between the console 28 and the display device 26. In other words, since cables for transmitting and receiving signals are not connected between the image capturing apparatus 22, the radiation detecting cassette 24, the display device 26, and the console 28, such cables are not placed on the floor of the operating room 12 where they would become obstacles to the operation performed by the surgeons 18, the radiological technician, or to other staff members present in the operating room 12. The surgeons 18, the radiological technician, and the other staff members in the operating room 12 can thus work more efficiently. The UWB wireless communications make it possible to reduce power consumption, increase fading resistance, and increase communication rates, compared with other wireless communications according to the related art.

In the radiation image capturing system 10A according to the first embodiment, the console 28 transmits an image capture permission signal from the transceiver 48 to the transceiver 96 by way of wireless communications. However, the console 28 may transmit an image capture permission signal from the transceiver 48 via the transceiver 76 to the transceiver 96 by way of wireless communications.

The radiation image capturing system 10A according to the first embodiment captures a radiation image of the patient 14 when one of the surgeons 18 or the radiological technician turns on the image capturing switch 72. However, it may also be configured to capture a radiation image of the patient 14 when one of the surgeons 18 or the radiological technician operates the console 28.

In the radiation image capturing system 10A according to the first embodiment, the radiation detector 40 housed in the radiation detecting cassette 24 directly converts the dose of the applied radiation X into an electric signal via the photoelectric conversion layer 51. However, the radiation image capturing system 10A may employ a radiation detector including a scintillator for converting the applied radiation X into visible light together with a solid-state detecting device made up of amorphous silicon (a-Si) or the like for converting the visible light into electric signals (see Japanese Patent No. 3494683).

Alternatively, the radiation image capturing system 10A may employ a light-conversion radiation detector for acquiring radiation image information. The light-conversion radiation detector operates as follows: When radiation is applied to a matrix of solid-state detecting devices, the solid-state detecting devices store an electrostatic latent image depending on the dose of the applied radiation. For reading the stored electrostatic latent image, reading light is applied to the solid-state detecting devices, thereby causing the solid-state detecting devices to generate an electric current representing the radiation image information. When erasing light is applied to the radiation detector, radiation image information representing a residual electrostatic latent image is erased from the radiation detector, which can thus be reused (see Japanese Laid-Open Patent Publication No. 2000-105297).

Figure 8:
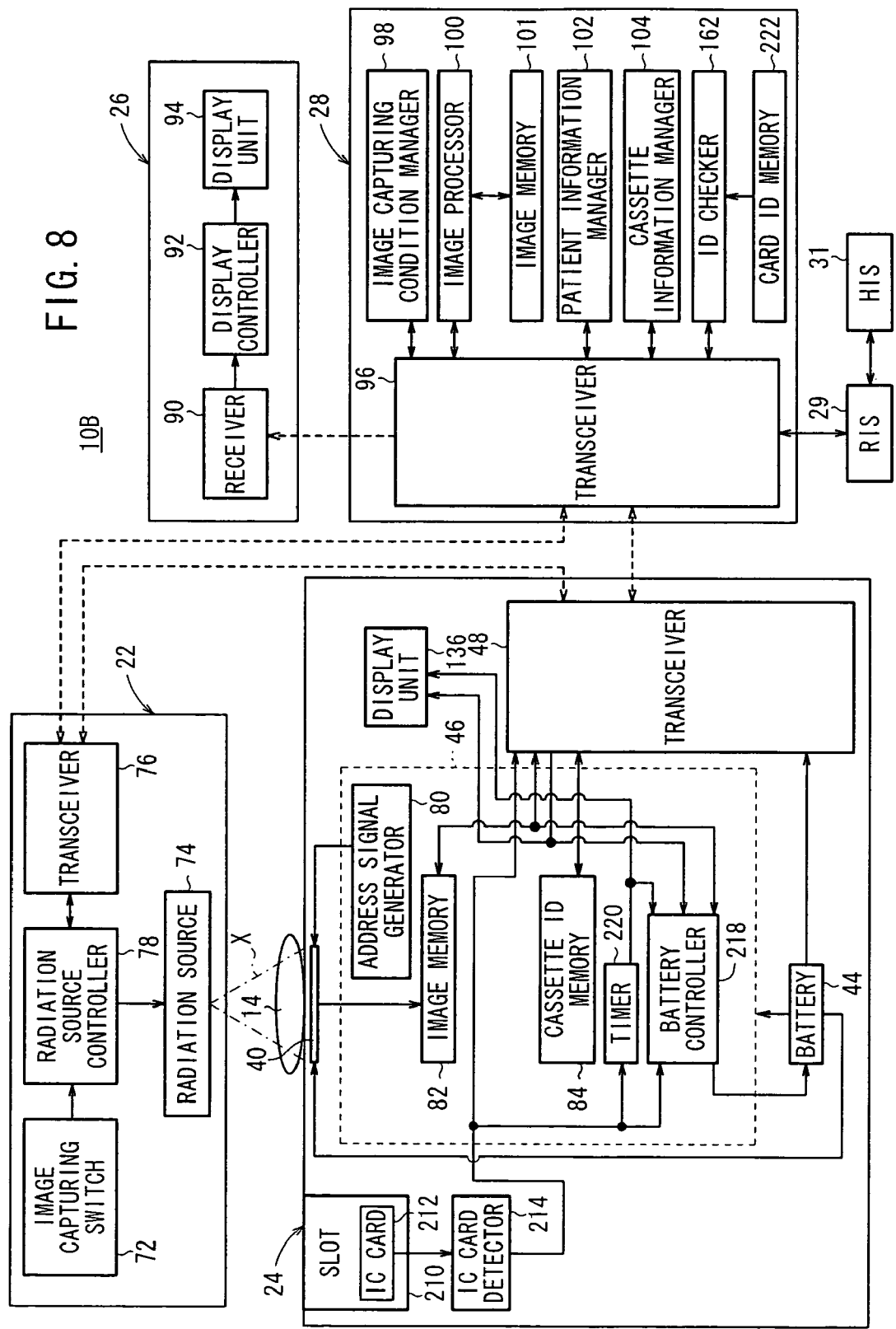
FIG. 8 is a block diagram of a radiation image capturing system according to a second embodiment of the present invention.

A radiation image capturing system 10B according to a second embodiment of the present invention will be described below with reference to FIGS. 8 and 9. Those parts of the radiation image capturing system 10B which are identical to those of the radiation image capturing system 10A according to the first embodiment (see FIGS. 1 through 7) are denoted by identical reference characters, and will not be described in detail below.

The radiation image capturing system 10B according to the second embodiment is different from the radiation image capturing system 10A according to the first embodiment in that the console 28 includes an ID checker 162 and a card ID memory 222.

Figure 9:
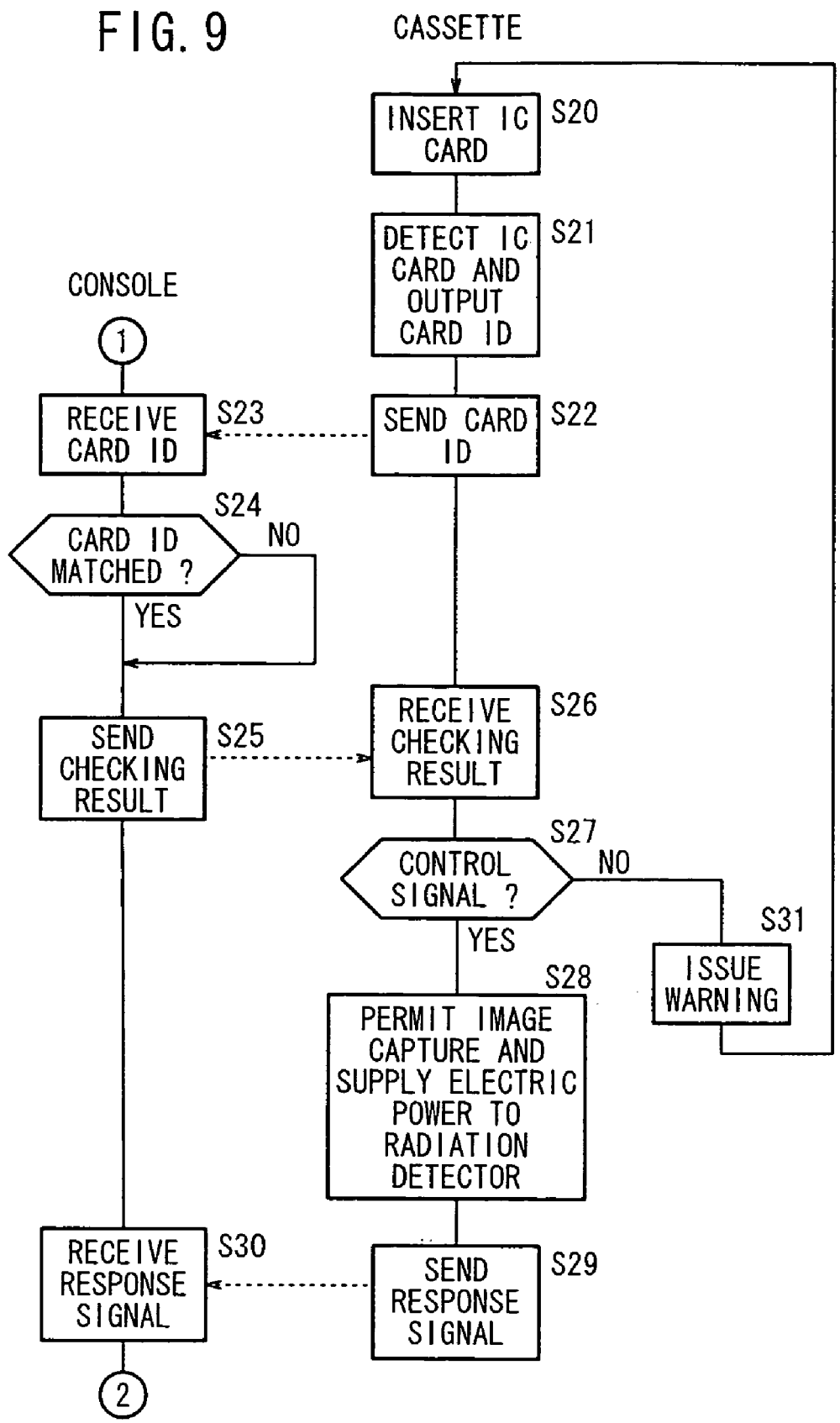
FIG. 9 is a flowchart of an operation sequence of the radiation image capturing system shown in FIG. 8.
Figure 10:
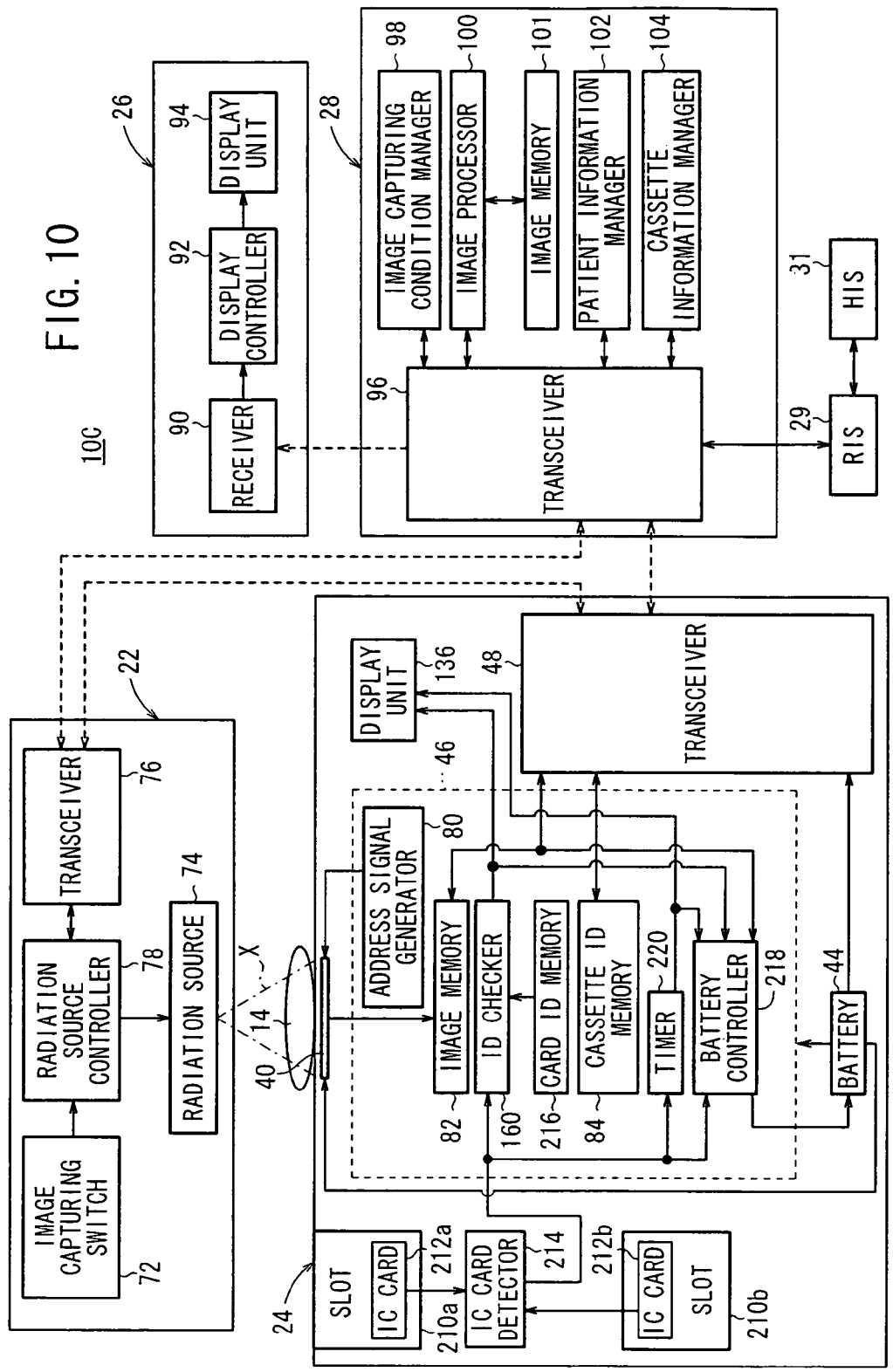
FIG. 10 is a block diagram of a radiation image capturing system according to a third embodiment of the present invention.
Figure 11:
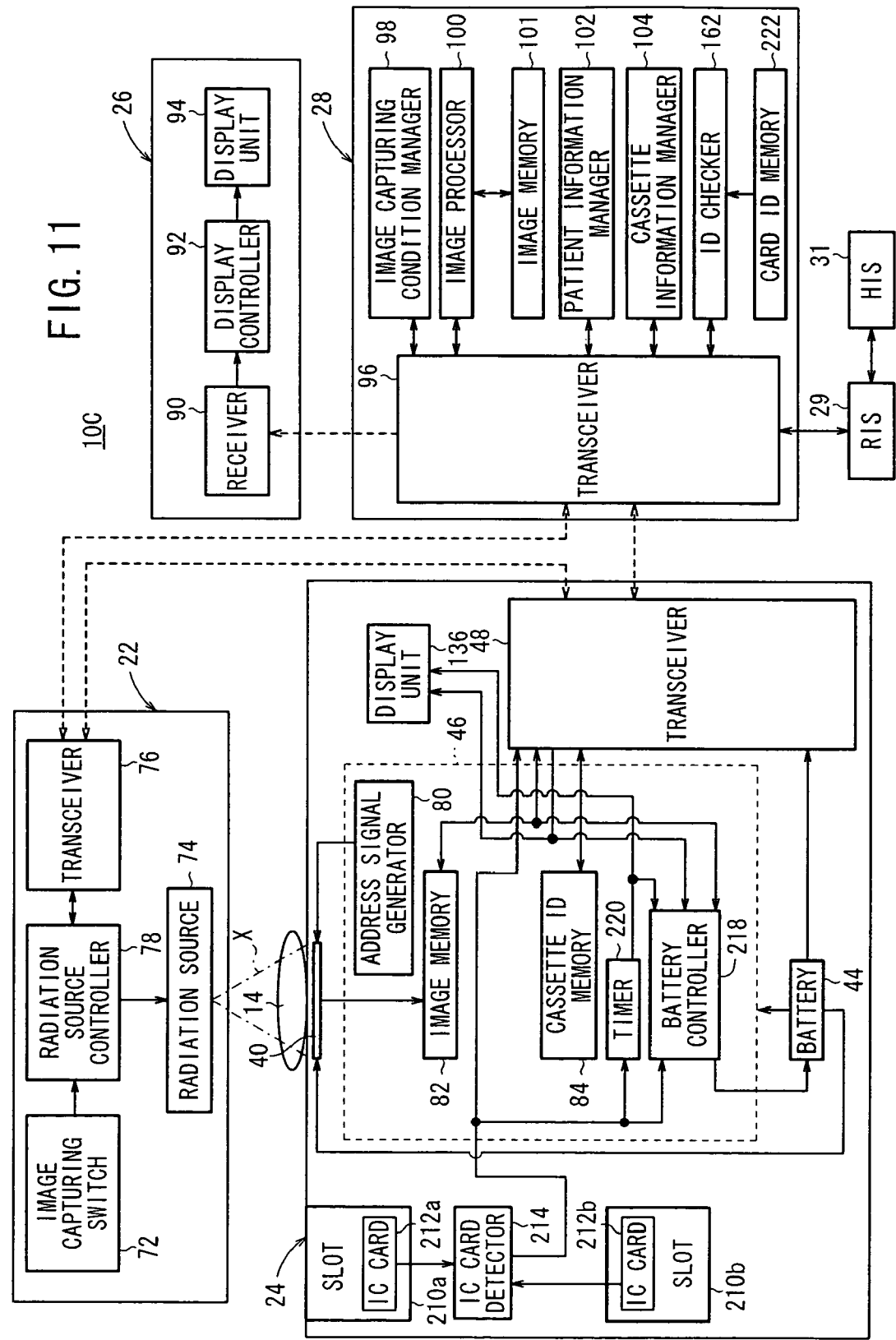
FIG. 11 is a block diagram of a modification of the radiation image capturing system according to the third embodiment of the present invention.
Figure 12:
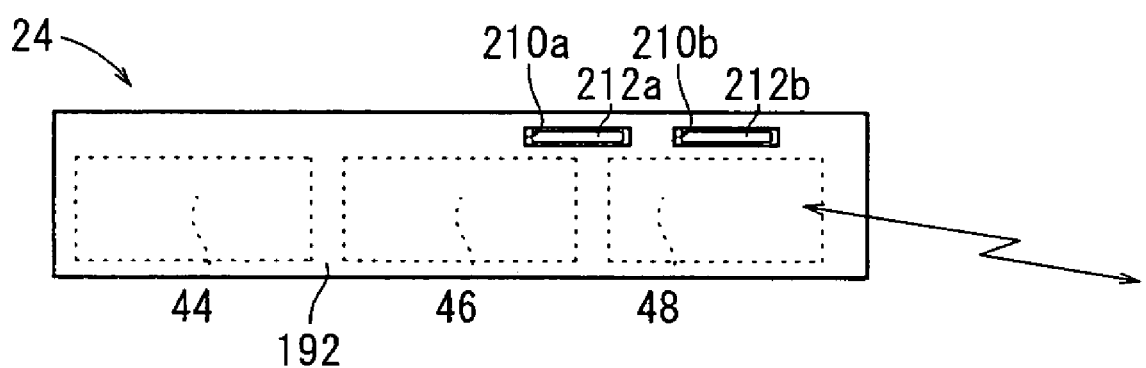
FIG. 12 is a front elevational view of the radiation detecting cassette shown in FIGS. 10 and 11.
Figure 13:
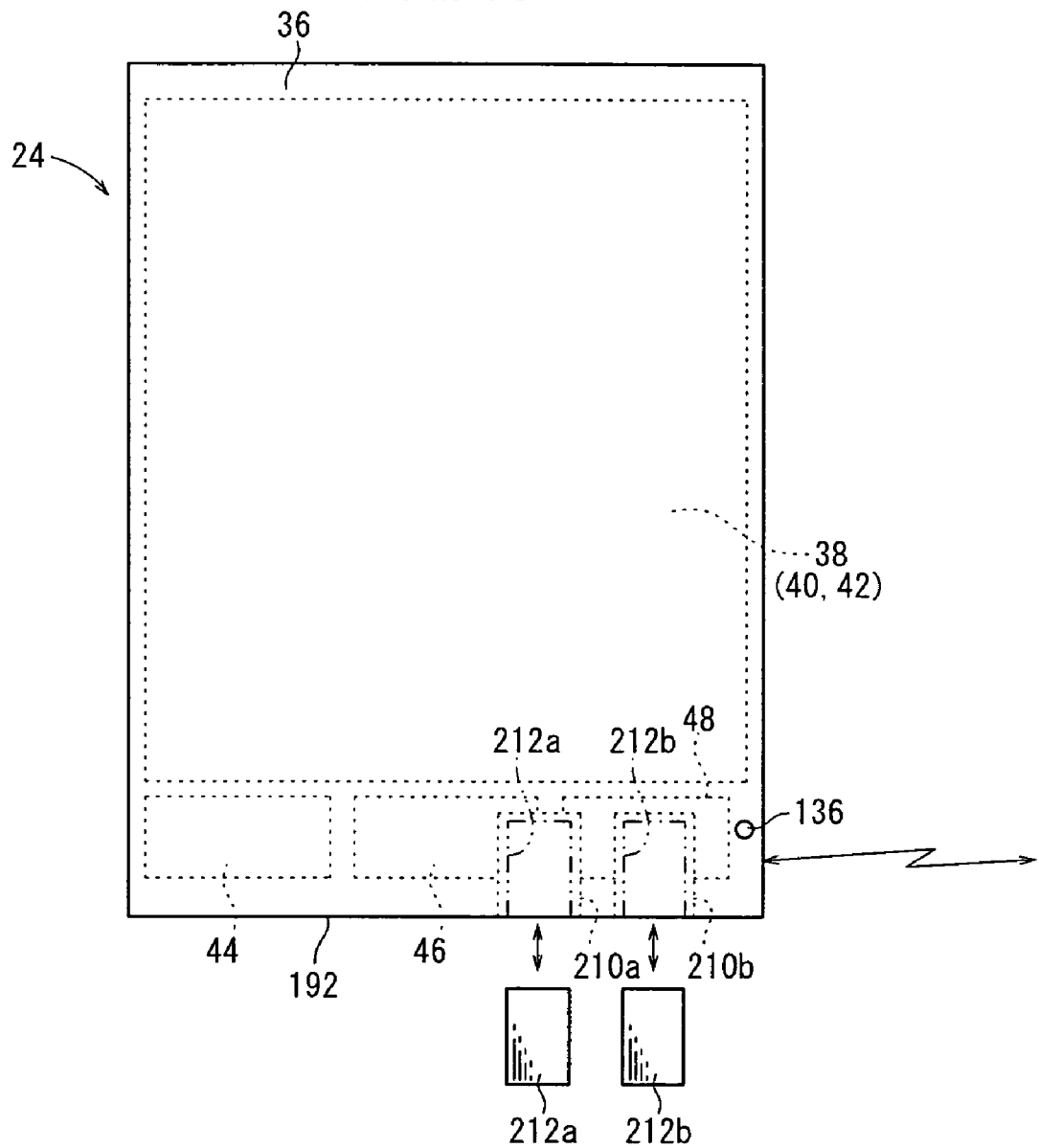
FIG. 13 is a plan view of the radiation detecting cassette shown in FIGS. 10 and 11.

FIG. 9 is a flowchart of an operation sequence of the radiation image capturing system 10B. The operation sequence shown in FIG. 9 will be described below also with reference to FIG. 7 when necessary.

When one of the surgeons 18 or the radiological technician inserts the IC card 212 (see FIGS. 3, 4, 6 and 8) of the patient 14, the surgeon 18, or the radiological technician into the slot 210 in step S20 before or after steps S1 through S3 shown in FIG. 7, the IC card detector 214 detects the IC card 212 inserted in the slot 210, outputs a detection signal to the battery controller 218 and the timer 220, reads the ID information from the IC card 212 in the slot 210, and outputs the read ID information to the transceiver 48 in step S21.

In step S22, the transceiver 48 sends the ID information to the transceiver 96 of the console 28 by way of wireless communications. The transceiver 96 receives the ID information in step S23. In step S24, the ID checker 162 of the console 28 checks the received ID information against the ID information in the card ID memory 222. If the received ID information matches the ID information in the card ID memory 222, then the ID checker 162 outputs the checking result (control signal) from the transceiver 96 to the transceiver 48 by way of wireless communications in step S25.

In step S26, the transceiver 48 outputs the received checking result to the battery controller 218. The battery controller 218 determines whether the checking result is the control signal or not in step S27. If the battery controller 218 judges that the checking result is the control signal in step S27, then the battery controller 218 outputs an image capture permission signal as a response signal to the transceiver 48, and controls the battery 44 to start supplying electric power to the radiation detector 40 based on the control signal in step S28. The battery 44 now starts supplying electric power to the radiation detector 40, readying the radiation detecting cassette 24 to capture a radiation image. The transceiver 48 sends the image capture permission signal to the console 28 by way of wireless communications in step S29. When the console 28 receives the image capture permission signal, it performs the processing from step S11 shown in FIG. 7 to capture a radiation image.

If the ID checker 162 judges that the received ID information does not match the ID information in the card ID memory 222, then the console 28 sends a checking result (warning signal) from the transceiver 96 to the transceiver 48 by way of wireless communications in step S25.

In step S26, the transceiver 48 outputs the received checking result to the battery controller 218. The battery controller 218 determines whether the checking result is the control signal or not in step S27. Since the checking result is the warning signal, the battery controller 218 judges that the checking result is not the control signal in step S27. The battery controller 218 does not output the image capture permission signal to the transceiver 48 and does not control the battery 44 to start supplying electric power to the radiation detector 40, but outputs the warning signal to the display unit 136.

The display unit 136 emits light from the LED, indicating the fact that the patient 14, the surgeon 18, or the radiological technician which is represented by the ID number stored in the IC card 212 and the patient 14, the surgeon 18, or the radiological technician which is represented by the ID information stored in the card ID memory 222 in step S31. Upon seeing the indication on the display unit 136, the surgeons 18 or the radiological technician recognizes that the IC card 212 and the radiation detecting cassette 24 do not match each other. Then, one of the surgeons 18 or the radiological technician replaces the IC card 212 presently inserted in the slot 210 with another IC card 212 in step S4, or replaces the radiation detecting cassette 24 with another radiation detecting cassette 24.

In the radiation image capturing system 10B according to the second embodiment, the console 28 includes the ID checker 162 and the card ID memory 222. Therefore, the radiation image capturing system 10B offers the same advantages as those of the radiation image capturing system 10A according to the first embodiment.

In the radiation image capturing system 10B according to the second embodiment, the transceiver 48 of the radiation detecting cassette 24 sends the ID information to the transceiver 96 of the console 28 by way of wireless communications, and the ID checker 162 of the console 28 checks the ID information. The transceiver 96 sends the checking result (control signal or warning signal) to the transceiver 48 by way of wireless communications, and the battery controller 218 determines whether the checking result is the control signal or the warning signal. Then, the transceiver 48 sends an image capture permission signal as a response signal to the transceiver 96 by way of wireless communications. Therefore, both the radiation detecting cassette 24 and the console 28 are capable of recognizing whether wireless communications are established between the transceivers 48, 96. Insofar as wireless communications are established between the transceivers 48, 96, the console 28 can control the radiation detecting cassette 24 via the transceivers 96, 48.

A radiation image capturing system 10C according to a third embodiment of the present invention will be described below with reference to FIGS. 10 through 13. Those parts of the radiation image capturing system 10C which are identical to those of the radiation image capturing system 10A according to the first embodiment (see FIGS. 1 through 7) are denoted by identical reference characters, and will not be described in detail below.

The radiation image capturing system 10C according to the third embodiment is different from the radiation image capturing systems 10A, 10B according to the first and second embodiments (see FIGS. 1 through 9) in that the radiation detecting cassette 24 has two slots 210a, 210b (see FIGS. 12 and 13) defined in the side wall 192 of the casing 34 thereof for receiving respective IC cards 212a, 212b inserted therein.

When the IC cards 212a, 212b are inserted in the respective slots 210a, 210b, the battery controller 218 controls the battery 44 to start supplying electric power to the radiation detector 40 based on detection signals and ID information from the IC cards 212a, 212b. Alternatively, when one of the IC cards 212a, 212b is inserted in either one of the slots 210a, 210b, the battery controller 218 controls the battery 44 to start supplying electric power to the radiation detector 40 based on a detection signal and ID information from the inserted IC card.

In the radiation image capturing system 10C, therefore, the ID checker 160 can perform a checking process, the timer 220 can measure time, the battery controller 218 can control the battery 44, and the display unit 136 can display a warning, based on detection signals and ID information from the IC cards 212a, 212b inserted in the slots 210a, 210b.

Furthermore, the ID checker 160 can perform a checking process, the timer 220 can measure time, the battery controller 218 can control the battery 44, and the display unit 136 can display a warning, based on a detection signal and ID information from one of the IC cards 212a, 212b that is inserted in either one of the slots 210a, 210b.

The IC cards 212a, 212b inserted in the slots 210a, 210b refer, for example, to the IC card carried by the patient 14 which is inserted in one of the slots 210a, 210b, and the IC card carried by the surgeon 18 or the radiological technician which is inserted in the other of the slots 210a, 210b. Only when the ID information of the IC cards 212a, 212b of the patient 14 and the surgeon 18 or the radiological technician in the operating room 12 matches the ID information stored in the card ID memory 216 as a result of the checking process performed by the ID checker 160, the battery 44 starts supplying electric power to the radiation detector 40 for capturing a radiation image of the patient 14.

As described above, when the IC cards 212a, 212b are inserted respectively into the slots 210a, 210b or when one of the IC cards 212a, 212b is inserted into either one of the slots 210a, 210b, the radiation image capturing system 10C according to the third embodiment operates in the same manner as the radiation image capturing systems 10A, 10B according to the first and second embodiments, and offers the same advantages as those of the radiation image capturing systems 10A, 10B according to the first and second embodiments. In FIGS. 10 through 13, the two slots 210a, 210b are shown as defined in the casing 34. However, the slots defined in the casing 34 are not limited to two slots.

The radiation image capturing system according to the present invention is not limited to the radiation image capturing systems 10A, 10B, 10C according to the first, second, and third embodiments described above, but may be changed or modified in various ways as described below.

When the radiation detecting cassette 24 is used in the operating room 12 or the like, the radiation detecting cassette 24 may be subjected to adhesion of blood, contamination, etc. However, when the radiation detecting cassette 24 is designed to have a waterproof and hermetically-sealed structure, and is sterilized and cleaned as necessary, one radiation detecting cassette 24 can be used repeatedly.

The radiation detecting cassette 24 is not limited to use in the operating room 12, and may be used for a medical examination and a round in the hospital.

Also, the radiation detecting cassette 24 may communicate with external devices via optical wireless communication using infrared light or the like, instead of general wireless communication using radio wave.

Figure 14:
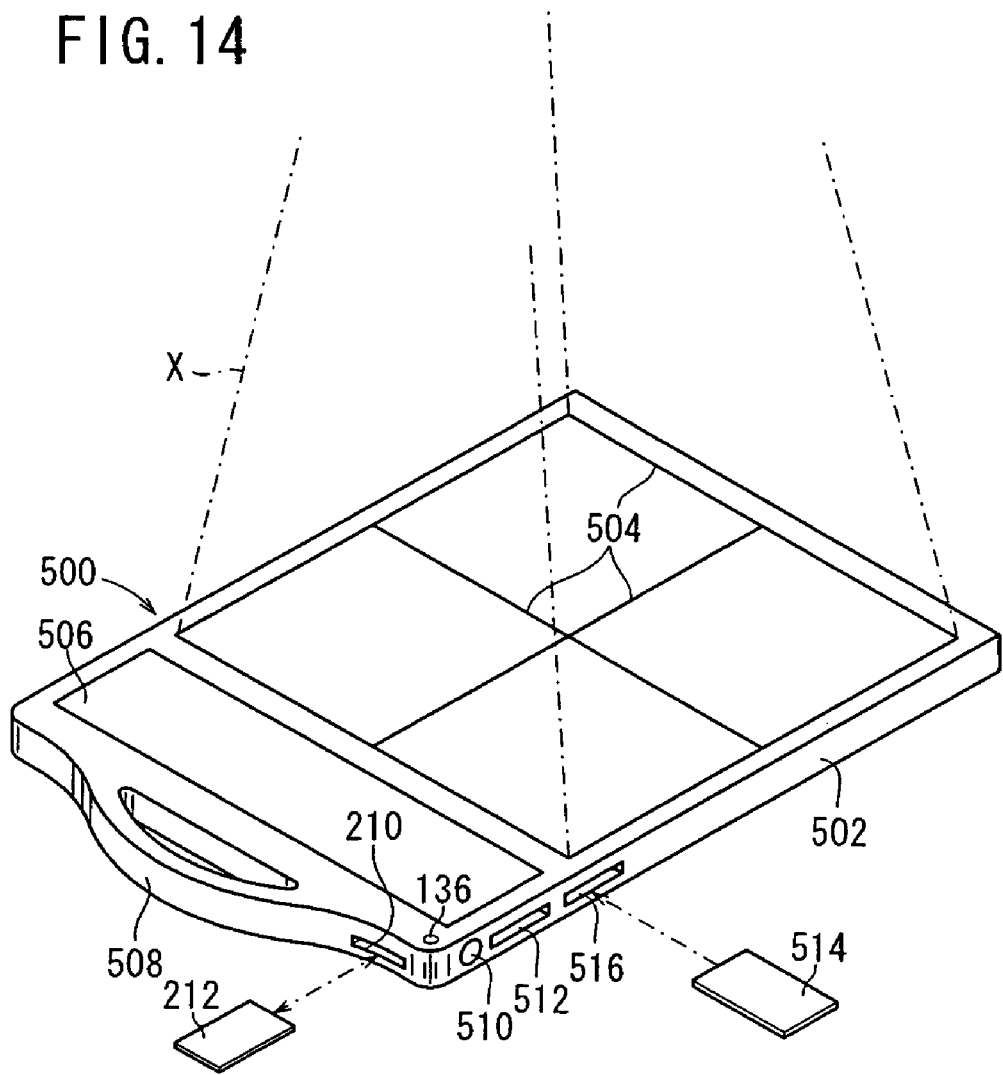
FIG. 14 is a perspective view of a radiation detecting cassette according to another embodiment of the present invention.

Preferably, the radiation detecting cassette 500 may be constructed as shown in FIG. 14.

Specifically, the radiation detecting cassette 500 includes a guiding line 504 drawn on the radiation-irradiated surface of a casing 502, the guiding line 504 serving as a reference for setting a captured area and a captured position. Using the guiding line 504, a subject (patient 14) can be positioned with respect to the radiation detecting cassette 500, and an area irradiated with the radiation X can be set, thereby recording radiation image information on an appropriate captured area.

The radiation detecting cassette 500 is provided with a display section 506 on an area thereof other than the captured area, for displaying various information about the radiation detecting cassette 500. The information which is displayed on the display section 506, includes ID information of a patient 14 whose radiation image information is to be recorded on the radiation detecting cassette 500, the number of times the radiation detecting cassette 500 has been used, an accumulated exposed radiation dose, a charging state (remaining battery level) of a battery 44 in the radiation detecting cassette 500, image capturing conditions of radiation image information, and a positioning image of the patient 14 with respect to the radiation detecting cassette 500. In this case, a radiological technician confirms a patient 14 based on the ID information displayed on the display section 506, for example, and also previously confirms that the radiation detecting cassette 500 is placed in a usable state. Then, the technician positions a desired captured area of the patient 14 with respect to the radiation detecting cassette 500 based on the displayed positioning image, thereby capturing appropriate radiation image information.

Also, the radiation detecting cassette 500 is provided with a handgrip 508, whereby it is easier to handle and carry the radiation detecting cassette 500.

Preferably, the radiation detecting cassette 500 may have, on a side thereof, an input terminal 510 for an AC adapter, a USB (Universal Serial Bus) terminal 512, and a card slot 516 for inserting a memory card 514.

When the charging function of the battery 44 in the radiation detecting cassette 500 becomes deteriorated, or when there is not enough time to fully charge the battery 44, the input terminal 510 is connected to the AC adapter to externally supply the radiation detecting cassette 500 with electric power, thereby enabling the radiation detecting cassette 500 to be used immediately.

The USB terminal 512 or the card slot 516 may be used when the radiation detecting cassette 500 cannot transmit and receive information to and from external devices such as the console 28 via wireless communication. Specifically, by connecting a cable to the USB terminal 512, the radiation detecting cassette 500 can transmit and receive information to and from the external devices via wire communication. Alternatively, the memory card 514 is inserted into the card slot 516, and necessary information is recorded on the memory card 514. After that, the memory card 514 is removed from the card slot 516, and the memory card 514 is inserted into the external device, thereby enabling information to be transferred.

Figure 15:
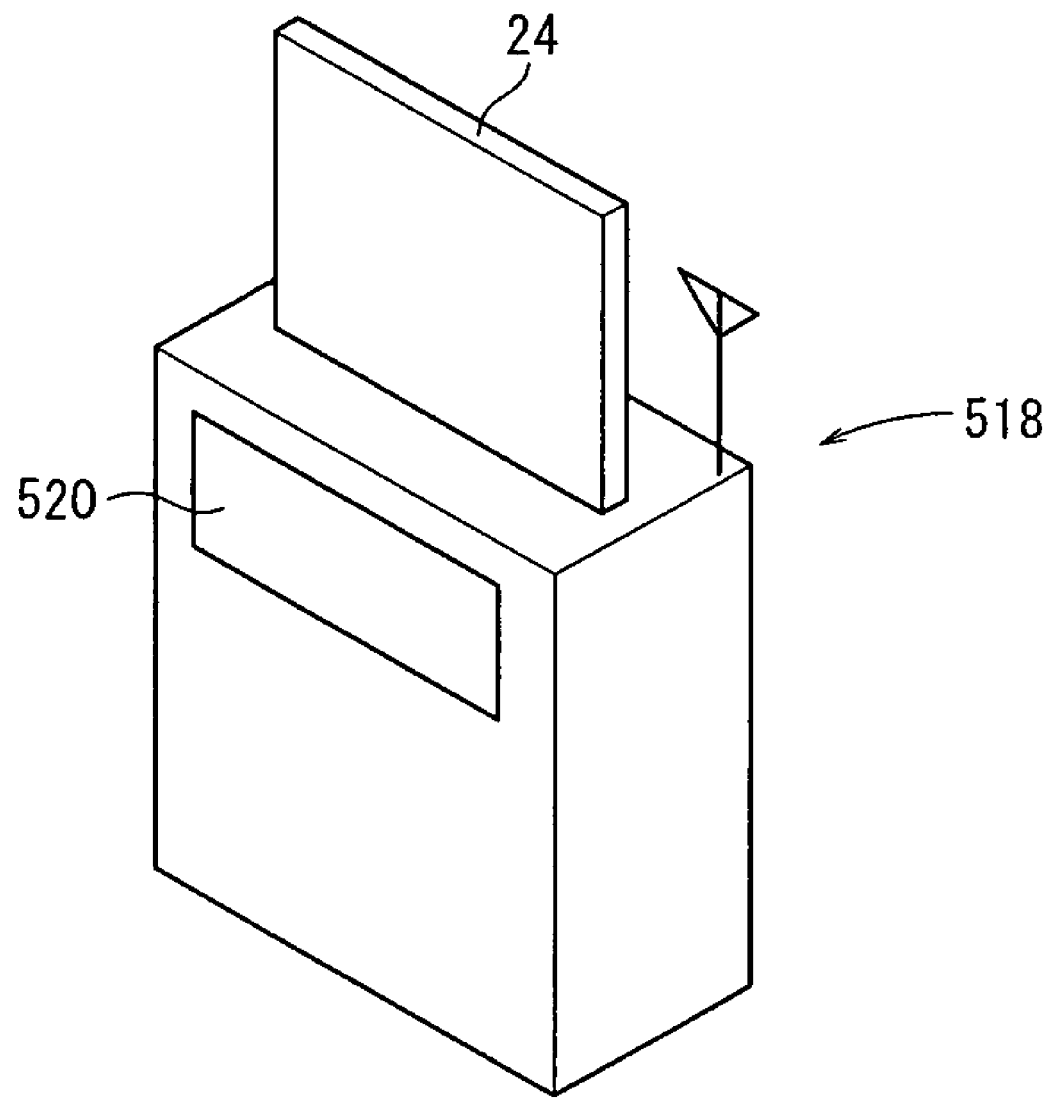
FIG. 15 is a perspective view of a cradle for charging a battery in the radiation detecting cassette.

Preferably, a cradle 518 may be disposed in the operating room 12 or at a desired place in the hospital, into which the radiation detecting cassette 24 is inserted to charge the internal battery 44, as shown in FIG. 15. In this case, in addition to charging the battery 44, the cradle 518 may transmit and receive necessary information to and from external devices such as HIS 31, RIS 29, the console 28, etc. by way of wireless or wire communications of the cradle 518. The information may include radiation image information which is recorded on the radiation detecting cassette 24 inserted into the cradle 518.

Also, the cradle 518 may be provided with a display section 520. The display section 520 may display necessary information including a charging state of the inserted radiation detecting cassette 24 and radiation image information acquired from the radiation detecting cassette 24.

Further, a plurality of cradles 518 may be connected to a network. In this case, information about charging states of radiation detecting cassettes 24 inserted in respective cradles 518 can be collected through the network, and the radiation detecting cassette 24 in a usable state can be located.

Although certain preferred embodiments of the present invention have been shown and described in detail, it should be understood that various changes and modifications may be made therein without departing from the scope of the appended claims.

What is claimed is:

1. A radiation detecting cassette comprising:
   a radiation conversion panel for detecting a radiation that has passed through a subject and converting the radiation into radiation image information;
   a recording medium mounting region for mounting therein a recording medium storing ID information of a person involved in capturing a radiation image;
   a recording medium detector for detecting mounting of said recording medium in said recording medium mounting region;
   a battery for energizing said radiation conversion panel; and
   a battery controller for controlling said battery to start supplying electric power to said radiation conversion panel based on a detected result from said recording medium detector.

2. A radiation detecting cassette according to claim 1, further comprising:
   an ID storage for storing ID information; and
   an ID checker,
   wherein said recording medium detector reads the ID information stored in said recording medium and outputs the read ID information to said ID checker when said recording medium detector detects mounting of said recording medium in said recording medium mounting region;
   said ID checker checks the ID information from said recording medium detector against the ID information stored in said ID storage; and
   if said ID checker judges that the ID information from said recording medium detector matches the ID information stored in said ID storage, said battery controller controls said battery to start supplying electric power to said radiation conversion panel.

3. A radiation detecting cassette according to claim 2, further comprising a first warning unit for indicating that the ID information from said recording medium detector does not match the ID information stored in said ID storage if said ID checker judges that the ID information from said recording medium detector does not match the ID information stored in said ID storage.

4. A radiation detecting cassette according to claim 1, further comprising a wireless communication unit for performing wireless communications with an external device, wherein when said recording medium detector detects removal of said recording medium from said recording medium mounting region while said wireless communication unit is transmitting said radiation image information to the external device by way of wireless communications, said battery controller controls said battery to stop supplying electric power to said radiation conversion panel after said wireless communication unit finishes transmitting said radiation image information.

5. A radiation detecting cassette according to claim 1, further comprising a wireless communication unit for performing wireless communications with an external device, wherein when said recording medium detector detects removal of said recording medium from said recording medium mounting region after said wireless communication unit finishes transmitting said radiation image information to the external device by way of wireless communications, or after said wireless communication unit finishes transmitting said radiation image information to the external device by way of wireless communications, said battery controller controls said battery to stop supplying electric power to said radiation conversion panel.

6. A radiation detecting cassette according to claim 1, further comprising:

a timer for starting to measure time from a time when said recording medium detector detects mounting of said recording medium in said recording medium mounting region; and a second warning unit for indicating that said recording medium is mounted in said recording medium mounting region when said timer measures a predetermined period of time from said time.

7. A radiation detecting cassette according to claim 6, wherein said battery controller controls said battery to stop supplying electric power to said radiation conversion panel when said timer measures the predetermined period of time from said time.

8. A radiation detecting cassette according to claim 1, wherein said recording medium mounting region comprises a plurality of recording medium mounting regions for mounting therein respective recording mediums; and when said recording medium detector detects mounting of said recording mediums respectively in said recording medium mounting regions, or when said recording medium detector detects mounting of one of said recording mediums in either one of said recording medium mounting regions, said battery controller controls said battery to start supplying electric power to said radiation conversion panel.

9. A radiation detecting cassette according to claim 1, further comprising a casing, said radiation conversion panel, said recording medium mounting region, said recording medium detector, said battery, and said battery controller being housed in said casing;

wherein said recording medium mounting region comprises a slot defined in said casing; and said recording medium comprises an IC card or a magnetic card insertable in said slot and storing, as said ID information, identifying information for identifying said subject or a surgeon or a radiological technician as said person involved in capturing the radiation image.

10. A radiation detecting cassette according to claim 4, wherein said wireless communication unit performs UWB wireless communications with the external device.

11. A radiation image capturing system comprising:

a radiation detecting cassette including a radiation conversion panel for detecting a radiation that has passed through a subject and converting the radiation into radiation image information;

a recording medium mounting region for mounting therein a recording medium storing ID information of a person involved in capturing a radiation image;

a recording medium detector for detecting mounting of said recording medium in said recording medium mounting region;

a battery for energizing said radiation conversion panel; and a battery controller for controlling said battery to start supplying electric power to said radiation conversion panel based on a detected result from said recording medium detector;

an image capturing apparatus including a radiation source for outputting said radiation; and a controller for controlling said radiation detecting cassette and said image capturing apparatus.

12. A radiation image capturing system comprising:

a radiation detecting cassette including a radiation conversion panel for detecting a radiation that has passed through a subject and converting the radiation into radiation image information;

a recording medium mounting region for mounting therein a recording medium storing ID information of a person involved in capturing a radiation image;

a recording medium detector for detecting mounting of said recording medium in said recording medium mounting region;

a battery for energizing said radiation conversion panel; and a battery controller for controlling said battery to start supplying electric power to said radiation conversion panel based on a detected result from said recording medium detector;

an image capturing apparatus including a radiation source for outputting said radiation; and a controller for controlling said radiation detecting cassette and said image capturing apparatus;

wherein said controller comprises an ID storage for storing ID information, and an ID checker;

said recording medium detector reads the ID information stored in said recording medium and outputs the read ID information to said ID checker when said recording medium detector detects mounting of said recording medium said recording medium mounting region;

said ID checker checks the ID information from said recording medium detector against the ID information stored in said ID storage; and if said ID checker judges that the ID information from said recording medium detector matches the ID information stored in said ID storage, said battery controller controls said battery to start supplying electric power to said radiation conversion panel.

13. A radiation image capturing system according to claim 12, wherein said radiation detecting cassette further comprises a third warning unit for indicating that the ID information from said recording medium detector does not match the ID information stored in said ID storage if said ID checker judges that the ID information from said recording medium detector does not match the ID information stored in said ID storage.

14. A radiation image capturing system according to claim 11, wherein said wireless communication unit, said controller, and said image capturing apparatus perform UWB wireless communications with each other.

* * * * *